US011585956B2

(12) United States Patent
Yang et al.

(10) Patent No.: US 11,585,956 B2
(45) Date of Patent: Feb. 21, 2023

(54) SHEAR VELOCITY RADIAL PROFILING BASED ON FLEXURAL MODE DISPERSION

(71) Applicant: Halliburton Energy Services, Inc., Houston, TX (US)

(72) Inventors: Yunfei Yang, Palo Alto, CA (US); Kristoffer Thomas Walker, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 811 days.

(21) Appl. No.: 16/488,907

(22) PCT Filed: Dec. 31, 2018

(86) PCT No.: PCT/US2018/068101
§ 371 (c)(1),
(2) Date: Aug. 26, 2019

(87) PCT Pub. No.: WO2020/142057
PCT Pub. Date: Jul. 9, 2020

(65) Prior Publication Data
US 2021/0356616 A1 Nov. 18, 2021

(51) Int. Cl.
*G01V 1/50* (2006.01)
*G01V 1/46* (2006.01)
*G01V 1/28* (2006.01)

(52) U.S. Cl.
CPC .............. *G01V 1/46* (2013.01); *G01V 1/284* (2013.01); *G01V 1/50* (2013.01); *G01V 2200/16* (2013.01); *G01V 2210/121* (2013.01); *G01V 2210/614* (2013.01); *G01V 2210/6222* (2013.01)

(58) Field of Classification Search
CPC . G01V 1/46; G01V 1/284; G01V 1/50; G01V 2200/16; G01V 2210/121; G01V 2210/614; G01V 2210/6222
See application file for complete search history.

(56) References Cited

U.S. PATENT DOCUMENTS

| 6,611,761 B2 | 8/2003 | Sinha et al. |
| 7,529,152 B2 | 5/2009 | Sinha et al. |
| 8,379,483 B2 * | 2/2013 | Tang ..................... G01V 1/50 367/75 |
| 2006/0256656 A1 | 11/2006 | Sinha et al. |

(Continued)

FOREIGN PATENT DOCUMENTS

WO 2018080486 A1 5/2018

OTHER PUBLICATIONS

Sinha, "Radial Profiling of Formation Shear Velocity from Borehole Flexural Dispersions", 2001 IEEE Ultrasonics Symposium, 2001 (Year: 2001).*

(Continued)

*Primary Examiner* — Krystine E Breier
(74) *Attorney, Agent, or Firm* — DeLizio, Peacock, Lewin & Guerra

(57) ABSTRACT

A method is disclosed for radially profiling shear velocities of flexural wave modes in a formation. The method includes establishing sensitivity kernels with two non-dimensionalized parameters and using said sensitivity kernels to perform an inversion for radial shear wave velocity profiles. This method may be used for LWD, MWD, or wireline logging operations.

18 Claims, 11 Drawing Sheets

(56) References Cited

U.S. PATENT DOCUMENTS

2010/0085835 A1    4/2010   Tang et al.
2014/0369165 A1   12/2014   Sinha
2015/0049585 A1    2/2015   Collins et al.

OTHER PUBLICATIONS

Burridge, et al., "Inversion for Formation Shear Modulus and Radial Depth of Investigation Using Borehole Flexural Waves", SEG Technical Program Expanded Abstracts, Society of Exploration Geophysicists, 1996, pp. 158-161.

Gill, et al., "Numerical Linear Algebra and Optimization", Numerical Linear Algebra and Optimization, vol. 1, 1991, pp. 74.

Gill, et al., "Procedures for Optimization Problems with a Mixture of Bounds and General Linear Constraints", ACM Transactions on Mathematical Software (TOMS), 10(3), pp. 282-298.

Tang, et al., "Mapping Formation Radial Shear-Wave Velocity Variation by a Constrained Inversion of Borehole Flexural-Wave Dispersion Data", Geophysics, 2010.

Yang, et al., "A Parameterized-Model-Based Radial Profiling for Formation Shear Slowness in Cased Boreholes", SEG Technical Program Expanded Abstracts, Society of Exploration Geophysicists, 2011, pp. 449-453.

Yang, et al., "A Theoretical Study on Formation Shear Radial Profiling in Well-Bonded Cased Boreholes Using Sonic Dispersion Data Based on a Parameterized Perturbation", Geophysics 77(3), WA197-WA210.

PCT Application Serial No. PCT/US2018/068101, International Search Report, dated Sep. 26, 2019, 3 pages.

PCT Application Serial No. PCT/US2018/068101, International Written Opinion, dated Sep. 26, 2019, 5 pages.

\* cited by examiner

SHEAR VELOCITY RADIAL PROFILING BASED ON FLEXURAL MODE DISPERSION

TECHNICAL FIELD

The disclosure generally relates to formation evaluation, and more particularly to formation evaluation using shear wave velocity radial profiling.

BACKGROUND

For formation evaluation, sonic well logging downhole may be used to mechanically perturb geologic formations. This perturbation can occur in the form of measurable waves, which can include shear, compressional, and Stoneley waves. A distribution of wave velocity values against frequency may be measured. Various formation properties can be determined based on these measurements.

BRIEF DESCRIPTION OF THE DRAWINGS

Embodiments of the disclosure may be better understood by referencing the accompanying drawings.

DESCRIPTION OF EMBODIMENTS

Figure 1:
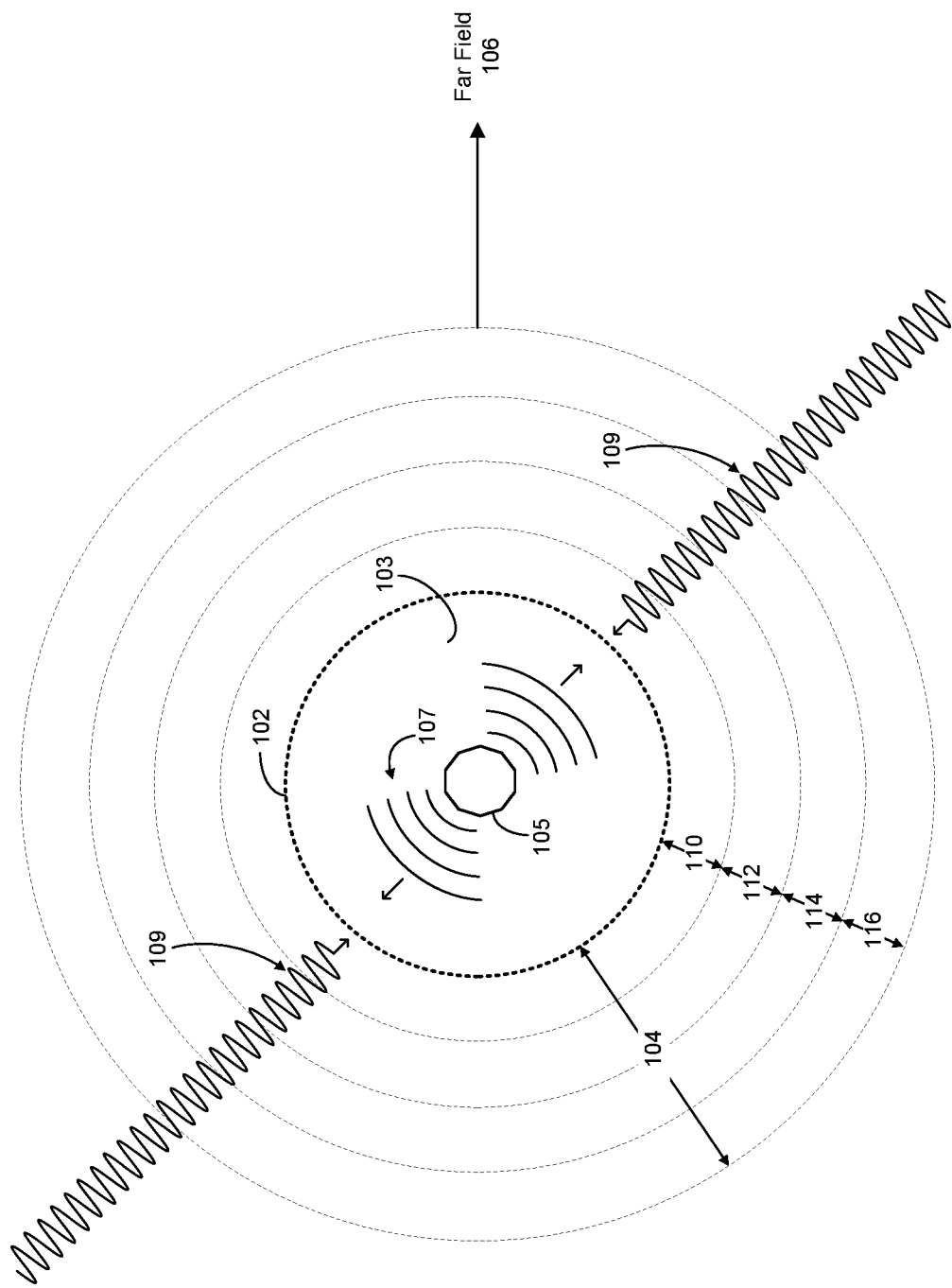
FIG. 1 is a diagram illustrating an overhead cross section view of an acoustic measurement tool disposed within a borehole for determining properties of a surrounding formation, according to some embodiments.

The description that follows includes example systems, methods, techniques, and program flows that embody embodiments of the disclosure. However, it is understood that this disclosure may be practiced without these specific details. In other instances, well-known instruction instances, protocols, structures and techniques have not been shown in detail in order not to obfuscate the description.

In some embodiments, sonic well logging that includes shear wave velocity (hereafter referred to as "shear velocity") radial profiling is performed downhole for formation evaluation. For example, well logging can include shear velocity radial profiling by analyzing flexural mode dispersions. Well logging can include downhole sonic tools that deploy broadband dipole sources to retrieve shear velocities for both fast and slow formations as flexural mode guided waves that are excited by dipole sources. The phase velocity of flexural waves varies as a function of frequency. By processing waveforms recorded from receivers, flexural wave phase velocity dispersion curves can be obtained, which typically plot the slownesses (inverse of the phase velocities) against frequency. As is generally known and depicted and described herein, "slowness" is the direct inverse (i.e., reciprocal) of velocity and is therefore effectively also a measure of velocity.

The dispersion of flexural wave velocities can provide relevant data regarding the radial variation of shear velocities in the formation. Particular frequency components in dispersion curves can directly correspond to particular wavelengths. By parametrizing the dispersion curves by wavelength, an approximation scheme may be used to estimate shear wave slowness radial profiles based on the parametrized dispersion of the flexural waves. Specifically, by analyzing a change in phase velocity with a corresponding wavelength, variation patterns can be determined in the shear velocity radial profiles.

An alteration zone is an annular region around a borehole having acoustic properties that are modified by various drilling and post drilling related activities and conditions such as drilling fluids, stress relief, etc. In some embodiments, multiple layers within the alteration zone can be defined. Within the alteration zone, shear velocity varies based in material and/or structural discontinuities. The shear velocities have an unknown radial variance and, in some embodiments, the alteration zone is divided into a selected number of layers and perturbations in the shear velocities of each annular layer within the alteration zone are approximated as constants. Parametrization parameters for the shear waves and for the flexural waves are utilized to construct a set of sensitivity kernels that are each associated with a respective unknown shear velocity and/or shear velocity perturbation value. The sensitivity kernels are utilized to construct a constrained linear least-squares relation that is utilized to determine shear velocity radial profiles from measured and reference flexural wave dispersions. Shear velocities for each of the alteration zone layers can be determined, in part, by inverting the constrained linear system of equations based on a linear system approximation. Such embodiments increase computational efficiency while providing an improved characterization of the near-field shear velocities for further analysis.

Example Alteration Zone

FIG. 1 is a diagram illustrating an overhead cross section view of a dipole acoustic tool 105 disposed within a borehole 103 for determining properties of a surrounding formation, according to some embodiments. The formation region surrounding a borehole 103 begins at a borehole edge 102 and includes an alteration zone 104 and a far field 106. The borehole 103 comprises a substantially cylindrical cavity formed by drilling, and is typically filled with liquid and/or slurry substances such as drilling fluid (drilling mud), water, etc.

The alteration zone 104 is an annular region surrounding the borehole 103, having the borehole edge 102 as its inner boundary and the far field 106 as its outer boundary. The alteration zone 104 is concentrically aligned with the borehole 103 and has an annular width, w, also referred to as alteration depth. The formation material composition and structure within the alteration zone 104 is relatively non-homogenous in comparison to materials in the far-field 106. Both the far-field and the alteration zone can be either azimuthally isotropic (FIG. 1) or anisotropic. In the anisotropic case, the flexural waves may be rotated into their fast and slow coordinate planes prior to independent analysis of each azimuth's rotated flexural waves. The alteration zone 104 is created by formation material alterations such as compaction, fracturing, differences in horizontal stresses, introduction of foreign substances (e.g., drilling fluid), and other factors that are incident to borehole drilling and conditioning.

In some embodiments, an alteration zone is partitioned into a number, N, of concentric rings/layers, each having a uniform annular width h=w/N. The alteration zone 104 comprises N=4 concentrically adjacent and aligned annular layers 110, 112, 114, and 116, each having an equal annular width, h=w/4. As depicted and described herein, the dipole acoustic tool 105 is configured to induce and measure acoustic energy within the alteration zone 104 and the far field 106. The dipole acoustic tool 105 includes transmitters (sources), receivers, and associated programmed hardware and software components and other electronics for inducing acoustic signals 107 in drilling fluid, mud, or slurry within borehole 103. The dipole generated acoustic signals 107 induce a flexural transverse motion of the borehole that travels up and down the borehole, returning flexural waves 109 to receivers of the dipole acoustic tool 105.

The dipole acoustic tool 105 is configured to measure acoustic wave properties and metrics including frequency dependent flexural wave measurements. Various aspects of acoustic waves may vary based on material properties of formation materials through which the acoustic waves traverse. Variations in shear phase velocity, also referred to as shear velocity perturbation, of an acoustic wave as it traverses a formation may be utilized as a significant metric in determining formation properties such as material composition, strength, stress, and structure. In some embodiments, shear velocity variations are determined based on flexural wave measurements by first measuring flexural wave phase velocities as a function of frequency (i.e., measure velocities at corresponding flexural wave frequencies).

The dipole acoustic tool 105 is positioned at a fixed depth within the borehole 103 and is configured to emit the acoustic signals 107 into the formation. The dipole acoustic tool 105 is further configured to measure velocities of the returning flexural waves 109 generated within the far field 106 and the alteration zone 104. The operations, functions, components, and systems disclosed herein generate, utilize, and otherwise process the flexural wave measurements 109 with normalized parameterization parameters to construct frequency dependent flexural wave velocity dispersion curves. The measurement of the velocities of the returning flexural waves 109 comprises a distribution of velocities according to frequencies of the flexural waves 109.

A first and a second type of dispersion curve can be generated from measurements made by the dipole acoustic tool 105. The first dispersion curve is a measured flexural dispersion curve $s_d$ and is based on flexural waves as measured along one azimuth. The second is a reference flexural dispersion curve $s_0$, which is generated by using the far field shear velocity $V_0$ as determined from $s_d$, as well as other information about the borehole and surrounding formation. The frequency dependent $s_d$ and $s_0$ dispersions may be converted to velocity values that are parameterized by (depend on) a normalized wavelength parameter that is based, in part, on the borehole radius.

In some embodiments, a normalized, non-dimensional wavelength value η is generated in accordance with the relation shown in Eqn. 1:

$$\eta(f) = \frac{v(f)}{fa} \qquad (1)$$

in which f is frequency, a is the borehole radius, and v(f) is the flexural wave phase velocity for a given frequency.

The wavelength-based parameterization is utilized to generate sensitivity kernels. The two dispersion curves are then used to create two perturbation functions for flexural wave phase velocity parametrized by nondimensionalized wavelength and nondimensionalized radius.

Figure 12:
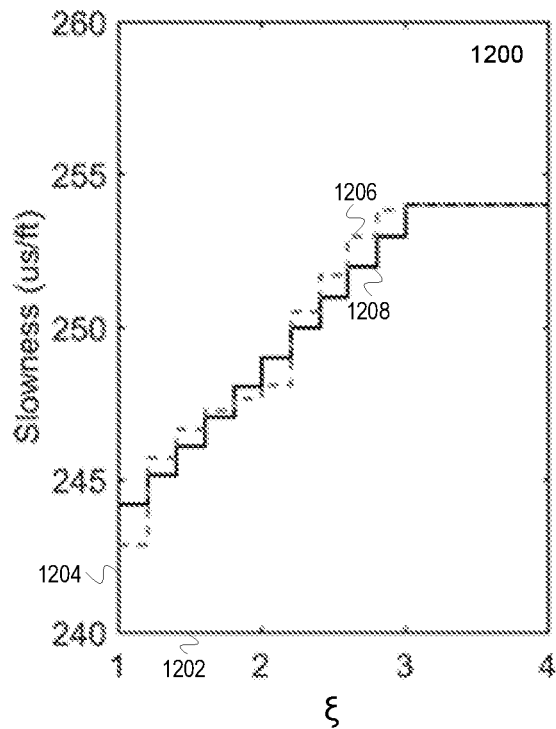
FIG. 12 depicts a plot of monotonically increasing true and estimated slowness dispersion curves against normalized radius, according to some embodiments.
Figure 13:
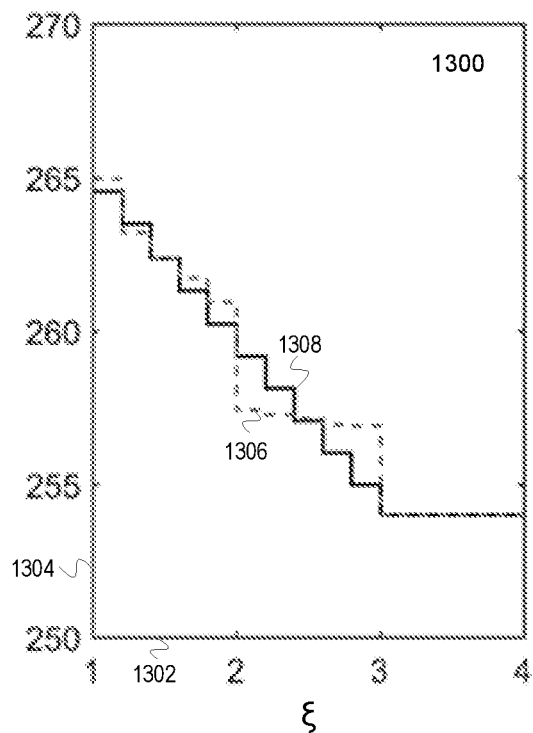
FIG. 13 depicts a plot of monotonically decreasing true and estimated slowness dispersion curves against normalized radius, according to some embodiments.

It is approximated that the shear velocity perturbation for each layer in an alteration zone is constant. Thus, the shear velocity perturbation functions can take the form of a step function in the alteration zone 104, wherein the width and height of each step corresponds to the width and shear velocity perturbation of each layer 110, 112, 114, and 116. Shear velocity is the inverse of slowness, and so transformations between the two may be readily performed. Example slowness dispersion curves are depicted in FIGS. 12 and 13.

Figure 2:
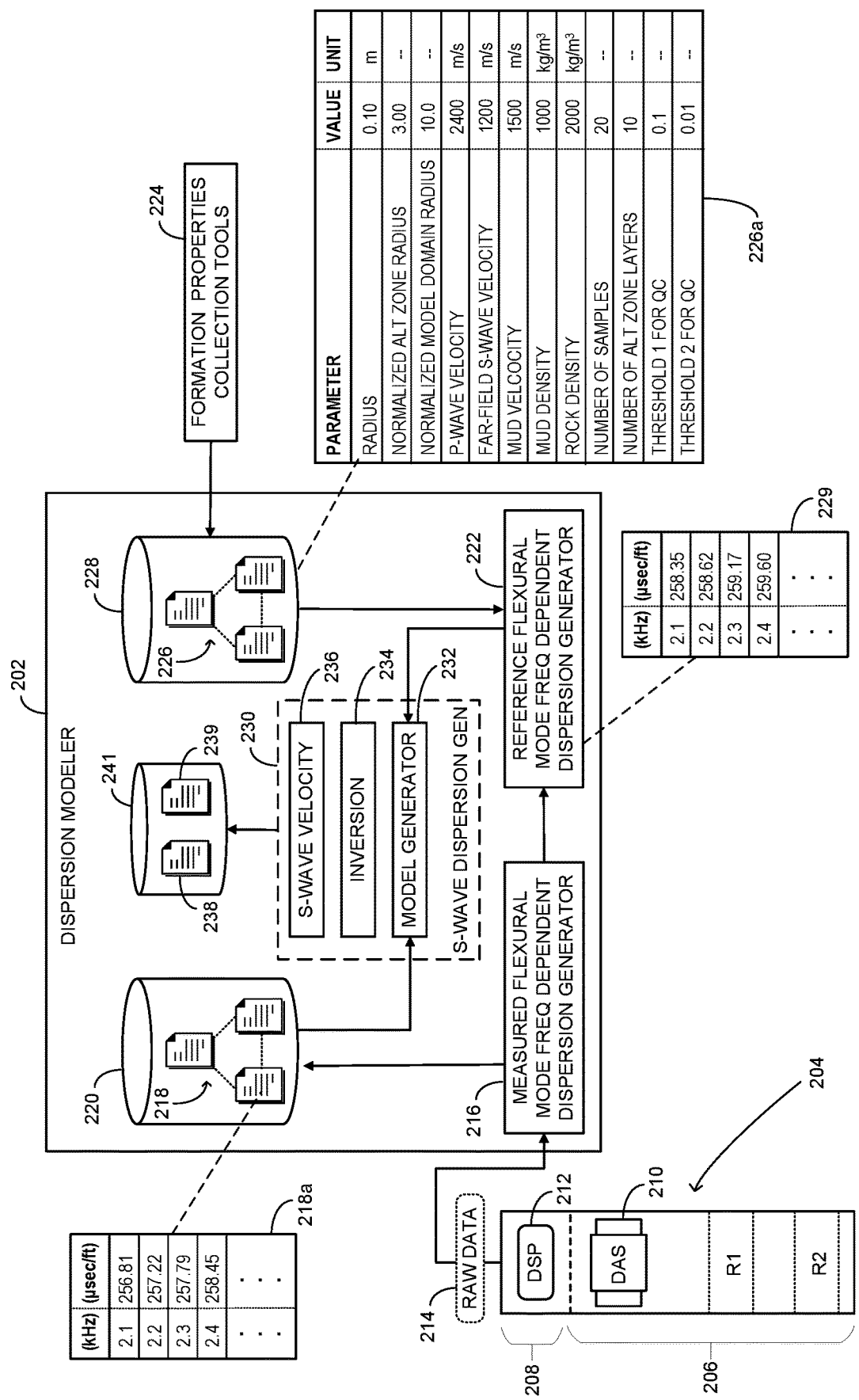
FIG. 2 is a block diagram depicting a shear velocity profiling system, according to some embodiments.

FIG. 2 is a block diagram depicting a shear velocity profiling system, according to some embodiments. The system includes a dispersion modeler 202 that receives and processes acoustic wave information from a dipole array tool 204. The dipole array tool 204 is disposed (e.g., via wireline) within a borehole (not depicted). The dipole array tool 204 has a logging sonde 206 that includes measurement sensor components and an array of acoustic receivers. In the depicted embodiment, the sensor components include a dipole acoustic source 210. The overall tool, including dipole acoustic source 210, may be disposed substantially centrally within a borehole as depicted in FIG. 1. The dipole acoustic source 210 is configured to emit acoustic energy into a formation (not depicted). The array of acoustic receivers includes receivers R1 and R2 configured as piezoelectric receivers, for example, to detect and measure velocities of flexural waves generated by the induced acoustic energy.

Figure 5:
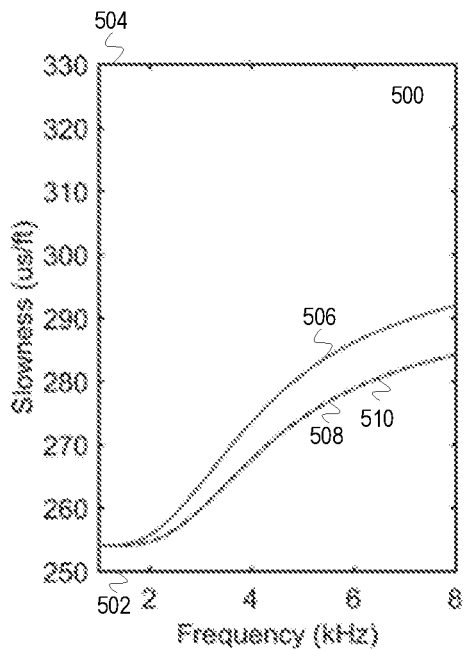
FIG. 5 depicts a plot of reference, true, and approximate slowness dispersion curves having monotonically decreasing slowness perturbations, according to some embodiments.

The dipole array tool 204 further includes an electronics assembly 208 comprising, in part, a digital signal processor 212 configured to process the measurement data from receivers R1 and R2. Raw data 214 from the electronics assembly 208 is transmitted to components of the dispersion modeler 202, such as a measured dispersion generator 216. The measured dispersion generator 216 is configured, using a combination of hardware and software logic components, to generate a flexural wave phase velocity dispersion such as depicted in FIG. 5 based on the raw data 214 from the dipole array tool 204. In some embodiments, generation of a flexural wave velocity dispersion includes generating a low-frequency asymptote of the measured flexural wave velocity dispersion. The measured dispersion generator 216 is further configured to determine a far-field shear velocity that corresponds to an asymptotic limit of the low-frequency asymptote. The measured dispersion generator 216 transmits the measured flexural wave velocity dispersion to a dispersion profile database 220 that records the dispersion as one of log records 218 including log record 218a. As depicted, log record 218a comprises a slowness-type frequency dependent velocity profile such as graphically depicted in FIG. 5 by the measured frequency dependent flexural wave slowness.

The dispersion modeler 202 further includes a reference dispersion generator 222 that receives and processes inputs from the measured dispersion generator 216 and a reference model database 228 to generate a reference flexural wave velocity dispersion. The reference dispersion generator 222 receives the far-field shear velocity value from the measured dispersion generator 216 or from that provided by other information. The reference dispersion generator 222 receives additional borehole- and formation-centric properties, such as those depicted in Table 2, from logging collection tools 224. For example, the reference dispersion generator 222 may receive mud velocity, mud density, and rock density values that have been measured by the collection tools 224 and represented within the reference model database 228 within parameter records 226, of which 226a is an example. The reference dispersion generator 222 is configured to generate a reference flexural wave velocity dispersion curve based on formation properties including the far-field shear velocity. The reference dispersion generator 222 transmits the reference flexural wave velocity dispersion curve as a record 229 comprising a slowness-type frequency dependent phase velocity such as the inverse of which is graphically depicted in FIG. 5.

The dispersion modeler 202 further includes an S-wave dispersion generator 230 that is configured, using any combination of hardware and/or program instructions to generate flexural phase velocity dispersions based on variations in shear velocity with radius in the alteration zone. The S-wave dispersion generator 230 includes a model generator 232, an inversion unit 234, and an S-wave velocity profiler unit 236. The model generator 232 receives the measured flexural wave dispersion from the dispersion profile database 220 or may receive the same profile directly from the measured dispersion generator 216. The dispersion data may be recorded within dispersion profile database 220 as dispersion data records 218 of which 218a is an example. The model generator 232 also receives input in the form of the reference flexural wave dispersion from the reference dispersion generator 222.

Figure 3:
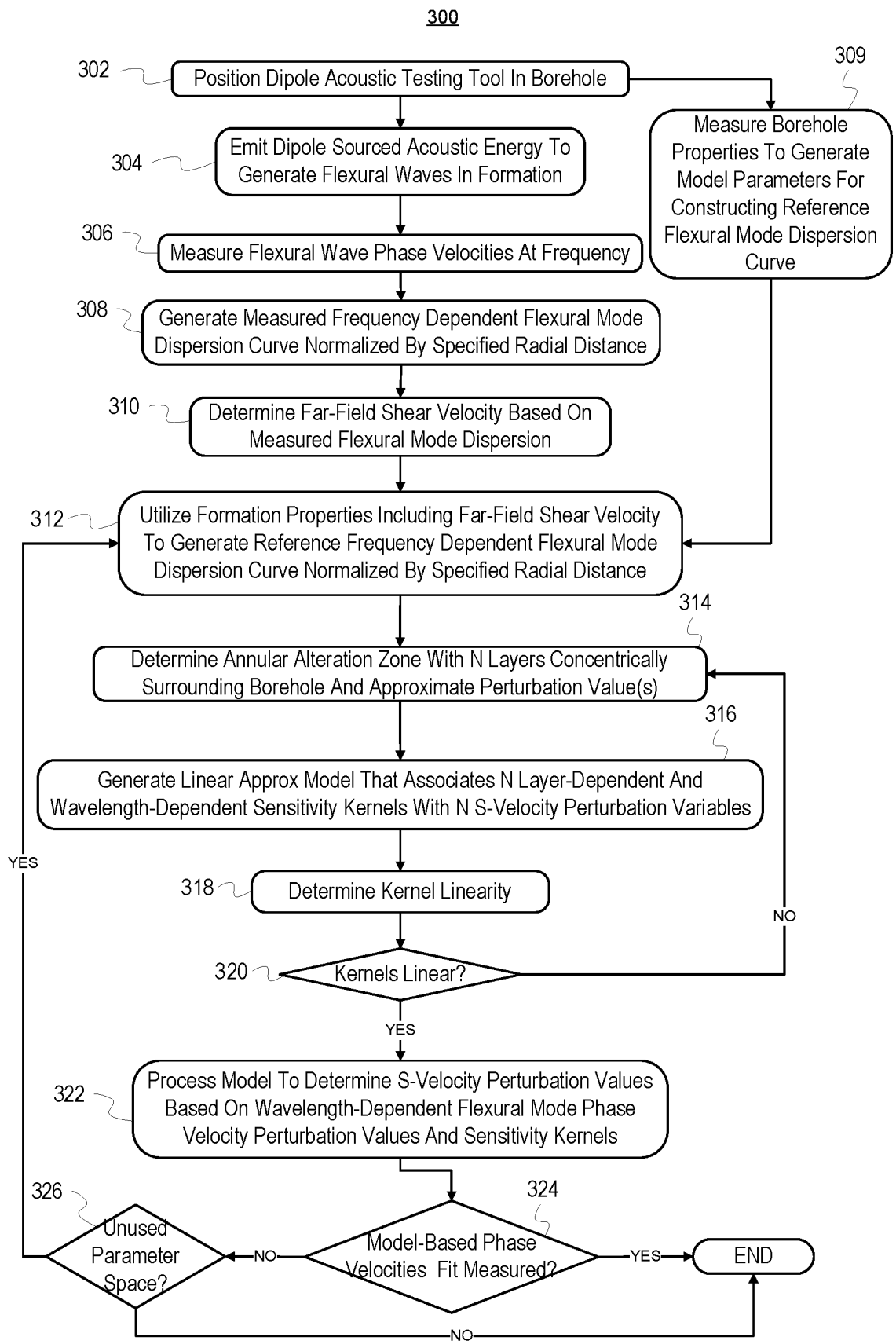
FIG. 3 is a flow diagram depicting operations and functions for determining a radial shear wave slowness profile from measured flexural waves, according to some embodiments.
Figure 4:
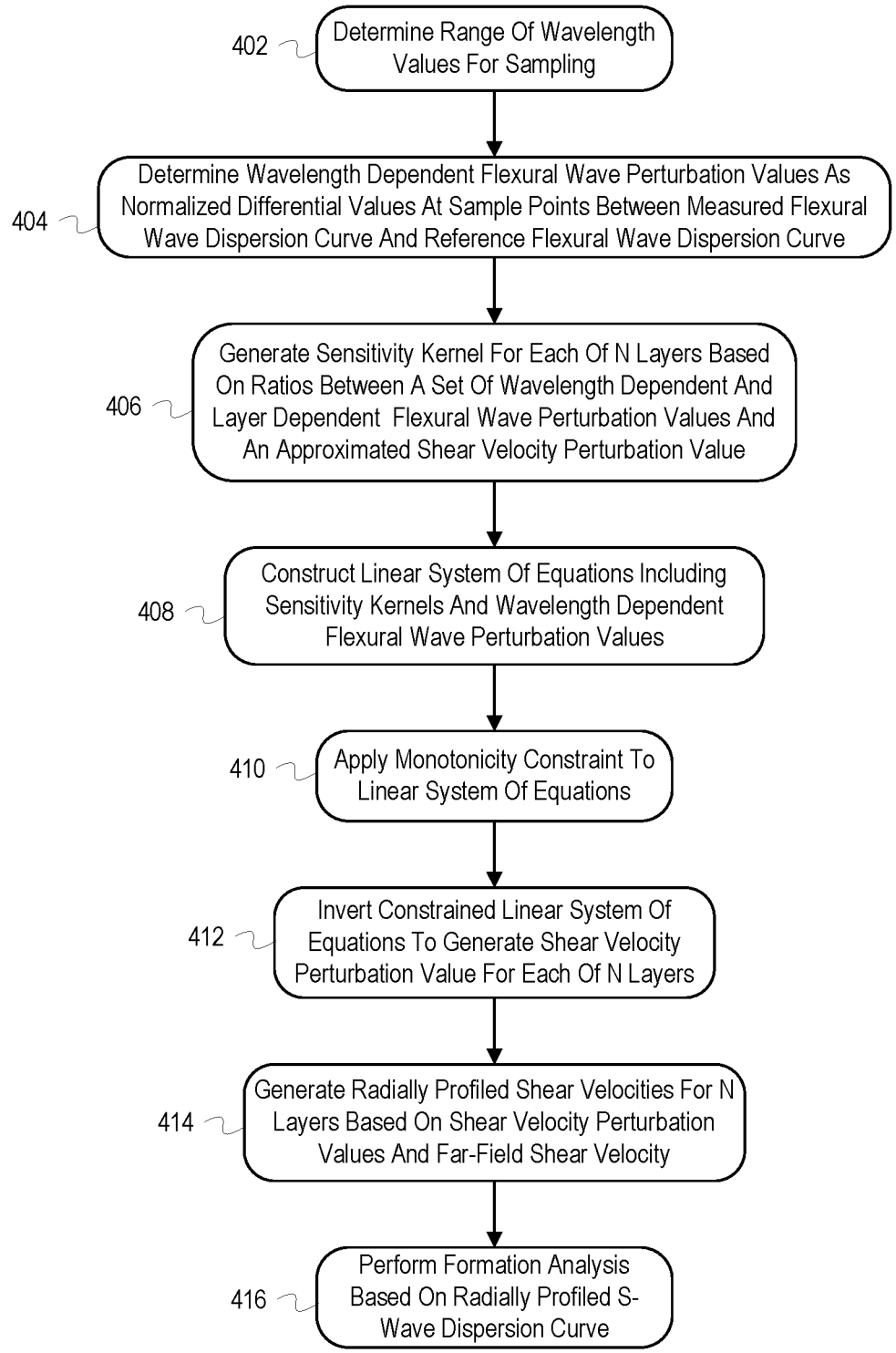
FIG. 4 is a flow diagram illustrating operations and functions for generating and processing a linear approximation model to generate a radial shear velocity profile, according to some embodiments.

The model generator 232 is configured, using any combination of hardware and/or program logic, to generate a linear approximation model based on the measured and flexural wave dispersions by generating sensitivity kernels that relationally associate measured flexural wave phase velocity perturbations with shear wave slowness perturbations in the alteration zone. The model generator 232 determines overall formation model parameters, in part, by defining an alteration zone based on a relation w=N*h, wherein w is an annular width of the alteration zone, N is a number of alteration zone layers, and h is an annular width of each layer. The model generator 232 generates a sensitivity kernel for each of the N layers based on ratios between each of a set of wavelength dependent and layer dependent flexural wave perturbation values and an approximated shear velocity perturbation value. FIGS. 3 and 4 depict and describe additional operations and functions for generating the sensitivity kernels.

The model generator 232 is further configured to select samples from the measured and reference flexural wave dispersions to generate a set of wavelength dependent perturbation values based on differences between wavelength-correspondent values in the measured flexural wave dispersion curve and the reference flexural wave dispersion curve. FIGS. 3 and 4 depict and describe additional operations and functions for generating wavelength dependent perturbation values. As described with reference to FIGS. 3 and 4 in conjunction with FIG. 2, the model generator 232 generates an executable model, such as in the form of an executable linear approximation model that includes an array of the sensitivity kernels associated with the shear velocity perturbation variables/unknowns and the wavelength dependent perturbation values in accordance with the relation depicted in equation (12).

The linear approximation model is passed as input to the inversion unit 234 which inverts the linear system of equations to determine/generate the perturbation for a radial shear wave velocity profile. The S-wave velocity profiler unit 236 is configured to determine corresponding radial shear wave velocities (including slowness profiles) based on the shear velocity perturbation values. For example, the S-wave velocity profiler unit 236 may determine the shear velocities for each of the N layers based on the far-field shear velocity and the perturbation values in accordance with the relation depicted in equation (15). The radial shear wave velocity profile may be stored for a given formation as shear velocity and/or shear slowness records 238 and 239 within a formation properties database 241.

Example Operations

Figure 14:
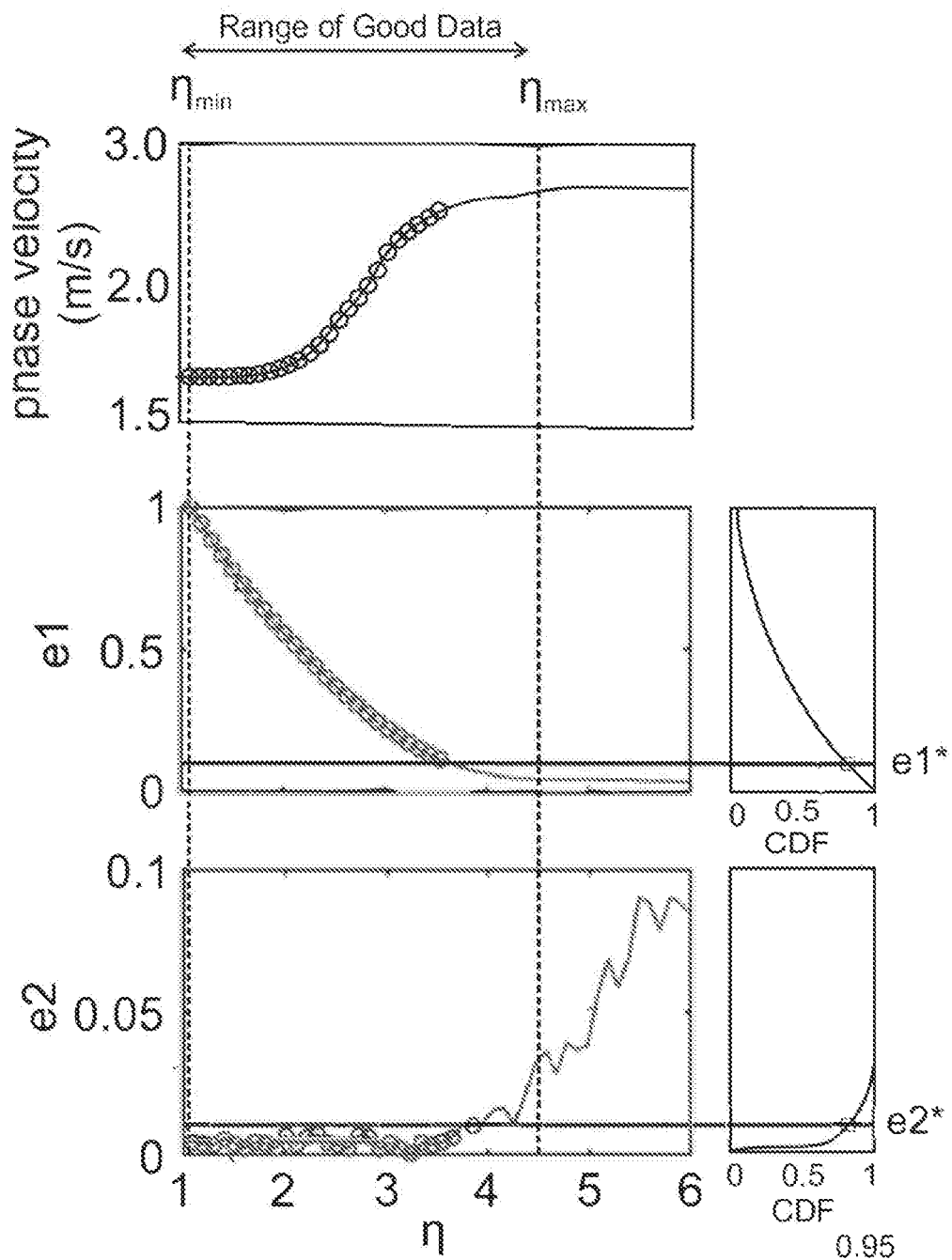
FIG. 14 depicts an example of the analysis performed by autonomous optimization of the selected number of layers N and perturbation value $u_i^0$ compute linear kernels.
Figure 15:
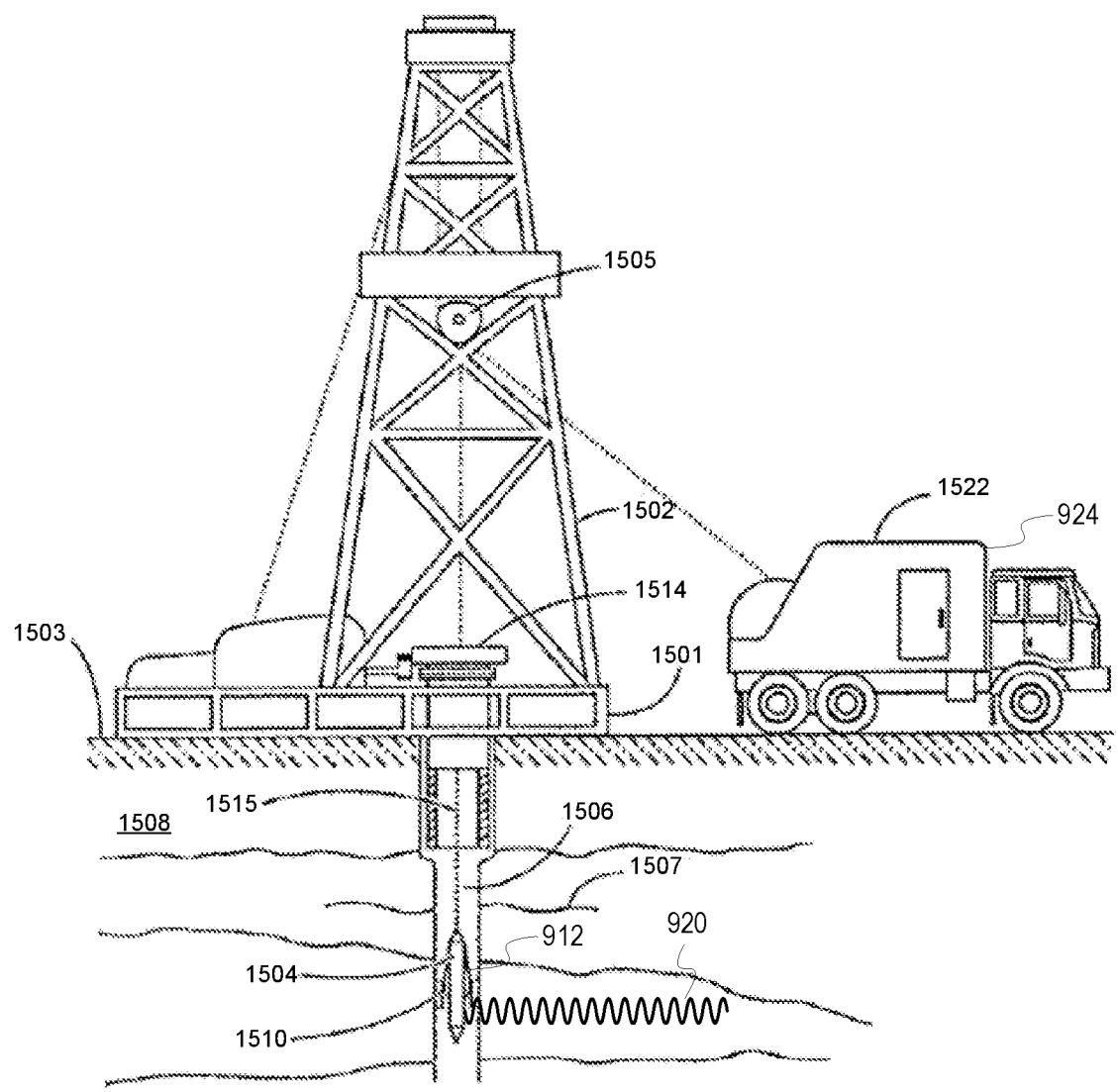
FIG. 15 is a diagram depicting a wireline well logging system that implements shear velocity profiling, according to some embodiments.

FIG. 3 is a flow diagram depicting operations and functions for determining a radial shear wave velocity profile from a measured flexural wave dispersion, according to some embodiments. The operations and functions depicted in FIG. 3 may be performed by one or more of the system, subsystems, and components illustrated and described with reference to FIGS. 1, 2, and 14-17. The processing begins as shown at block 302, at which a dipole acoustic logging tool comprising a dipole acoustic source and an array of two or more acoustic receivers is positioned in a borehole to perform acoustic measurement collection. For example, as shown in FIG. 1, dipole acoustic tool 105 is centrally deployed at one or more depths within borehole 103. As shown in FIG. 15, a dipole acoustic tool 1510 may be integrated as part of a wireline tool 1504 that is deployed in a borehole 1506 surrounded by the formation 1508 prior to acoustic measurement evaluation the formation 1508.

At block 304, the dipole acoustic tool emits acoustic energy to generate flexural waves in a surrounding formation. For example, with reference to FIG. 1, dipole acoustic tool 105 emits acoustic energy manifesting as the acoustic signals 107 through the borehole liquid/slurry media and into the surrounding formation beginning at the borehole edge 102. Based on the emission of acoustic energy into the surrounding formation, flexural waves are generated within the surrounding formation. The physical characteristics and propagation of these flexural waves are dictated by formation properties, so a known acoustic output can be used to measure the influence of the formation on flexural waves and determine physical characteristics of the formation.

At block 306, the acoustic receiver array within the dipole acoustic tool detects flexural waves from the formation resulting from the emitted acoustic energy. With reference to FIG. 1, the dipole acoustic tool 110 can detect the flexural waves 109 by a receiver array (not expressly depicted). The detection of the flexural waves entails measuring flexural wave attributes such as amplitude, frequency, and phase velocity. Attributes of the formation such as material stiffness, stress, lithology, porosity, etc. can be derived from the flexural wave attributes measured by the acoustic logging tool. The distribution of flexural wave frequencies may be significantly altered from the emitted acoustic energy signal based on the well and formation attributes. In turn, the signal alterations can be correlated to variations in the stiffness of the materials in the surrounding formation. The acoustic receiver array may comprise a number of acoustic receivers that are separated vertically (i.e., along the length of the tool) and/or circumferentially having equal or otherwise symmetric azimuthal spacings. In the depicted embodiment, the acoustic receiver array and associated signal processing electronics, such as within the electronics assembly 208 of FIG. 2, measure the phase velocity of the flexural waves at frequency. The minimum and maximum frequencies that define the range of well-resolved phase velocities measurements are saved for later processing.

At block 308, a measured flexural wave velocity dispersion curve, such as the measured slowness-type dispersion curve $s_d$ in FIG. 5, is generated from measurements made along a specified azimuth. With reference to FIGS. 1 and 2, the dispersion curve $s_d$ may be constructed from measurements performed by dipole acoustic tools 105 or 204 along a specified azimuthal direction within the borehole and surrounding formation. In some embodiments, generating the measured flexural wave dispersion curve may comprise determining the shear modulus of the formation as a function of frequency and finding the shear velocity by taking the square root of the ratio of shear modulus to rock density in the formation. In other embodiments, other equations, methods, or software may be used to determine a measured dispersion curve $s_d$ automatically from measurements made along a specified azimuth. Example flexural wave dispersion curves are shown in FIGS. 5 and 6.

FIG. 5 depicts a plot of reference, true, and approximate slowness dispersion curves having monotonically decreasing slowness perturbations due to the variation in shear slowness as a function of radius into the formation, according to some embodiments. A plot 500 includes an x-axis 502 representing flexural wave frequency in kilohertz (kHz). The plot 500 also includes a y-axis 504 representing slowness of flexural waves in microseconds per feet (μs/ft). A line 506 depicts the reference dispersion curve $s_0$. Two lines depict the dispersion curves from the observed (508) and best-fitting model 510). The reference curve 506 may be obtained by determining a far-field shear velocity and additional model parameters and assuming an isotropic, homogenous formation then using an acoustic propagator to simulate flexural wave propagation along the borehole axis as at blocks 310-312. The true curve 508 is a measured slowness dispersion curve selected for the purposes of creating the plot 500. The approximated curve 510 is the result of applying the processes of FIGS. 3 and 4 to measurements made on a formation with an alteration zone represented by the true curve 508 and converting from shear velocity parametrized by radius to slowness parametrized by frequency.

As can be seen, the predicted curve 510 matches the observed dispersion curve 508. Because the approximated dispersion curve 510 is strictly less than the reference dispersion 506, the slowness perturbation is negative and monotonically decreasing. Determining the sign and monotonicity of a dispersion curve indicates significant information about the linear system of equations incorporated within a linear approximation model as depicted and described in further detail with reference to FIG. 4. The significance of the selected or otherwise determined sign and monotonicity is evident from the plots shown in FIGS. 12 and 13. The plots 1200 and 1300 may optimally represent any dispersion curve based on the sign and monotonicity of corresponding perturbation functions. It is important to ensure that the variables which several dispersion curves depend on are the same when making comparisons, because the transformation between (for example) frequency and wavelength changes the behavior of the dispersion curve (as does changing between slowness and shear velocity dispersion curves).

Figure 6:
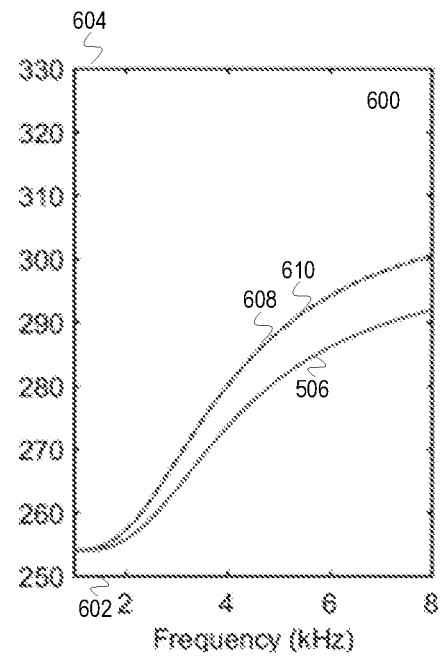
FIG. 6 depicts a plot of reference, true, and approximate slowness dispersion curves having monotonically increasing slowness perturbations, according to some embodiments.

FIG. 6 depicts a plot of reference, true, and approximate slowness dispersion curves having monotonically increasing slowness perturbations, according to some embodiments. A plot 600 includes an x-axis 602 representing flexural wave frequency in kilohertz (kHz). The plot 600 also includes a y-axis 604 representing slowness of flexural waves in microseconds per feet (μs/ft). A line 606 depicts the reference dispersion curve $s_0$. Two lines depict the observed (608) and best-fitting model (610) dispersion curves. The reference curve 606 may be obtained by determining a far-field shear velocity and additional model parameters and assuming an isotropic, homogenous formation then using an acoustic propagator to build flexural waves towards a tool axis from the far field as at blocks 310-312. The true curve 608 is a slowness dispersion curve selected for the purposes of creating the plot 600. The approximated curve 610 is the result of applying the processes of FIGS. 3 and 4 to measurements made on a formation with an alteration zone represented by the true curve 608 and converting from shear velocity parametrized by radius to slowness parametrized by frequency.

As illustrated, the predicted curve 610 matches the observed dispersion curve 608. Because the approximated dispersion curve 610 is strictly greater than the reference dispersion 606, the slowness perturbation is positive and monotonically increasing. Determining the sign and monotonicity of a dispersion curve indicates significant information about the linear system of equations incorporated within the linear approximation model that is generated as depicted and described with reference to FIG. 4.

At block 310, model parameters including far-field shear velocity $V_0$ for constructing the reference dispersion curve are determined from the measured flexural wave velocity dispersion. Alternatively, $V_0$ can be provided by other tools as an input parameter. These model parameters may be used to create a reference dispersion curve from an acoustic model of the formation. The far-field shear velocity $V_0$ may be determined by measuring the low-frequency asymptote of flexural modes and is the low-frequency asymptotic limit of the flexural wave phase velocity.

Figure 16:
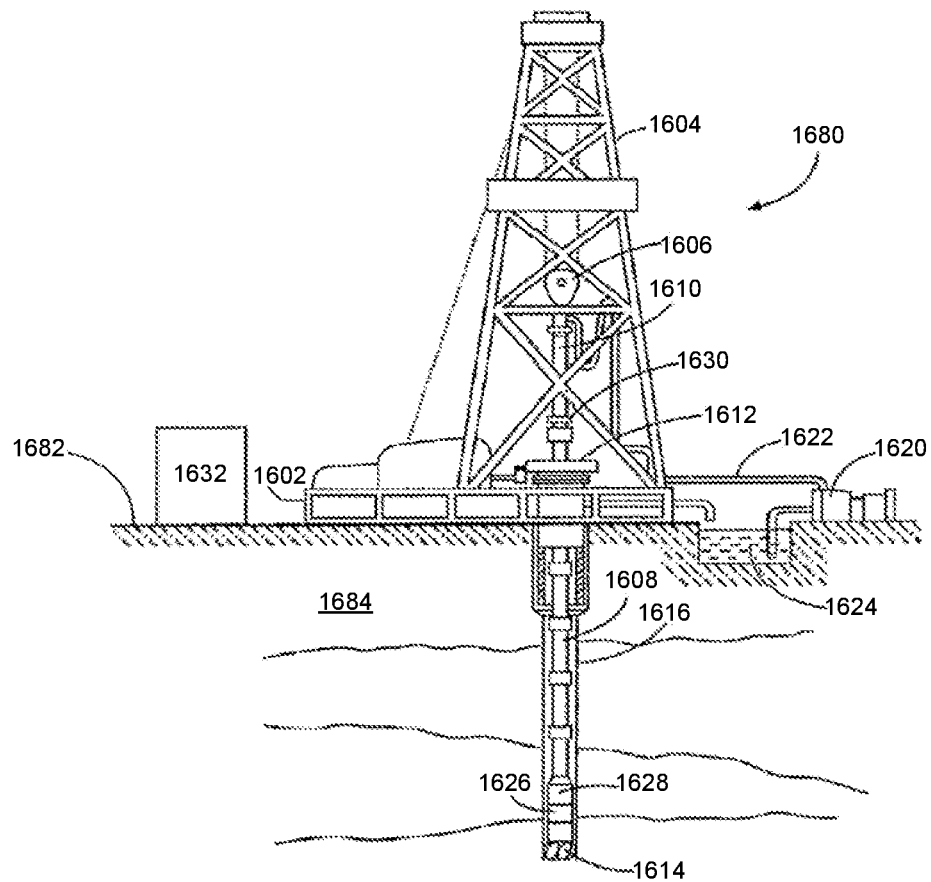
FIG. 16 depicts an example logging while drilling (LWD) system that implements shear velocity profiling, according to some embodiments.

Other model parameters (e.g., rock and mud density, borehole radius, mud speed, P-wave velocity, etc.) as well as $V_0$ itself may be determined by one or more of estimation, previous measurement, and current measurement using tools on a tool array alongside an acoustic logging tool as shown at block 309. For example, with reference to FIGS. 1 and 2, the logging tools 105 and 204 may include sensor and measurement components configured to measure various formation parameters, such as ultrasonic standoffs for measuring borehole radius or neutron logging tools for determining mud and rock densities. The dipole acoustic tool 110 may provide measured data to the computer 122 for processing. FIG. 16 shows an example computer with a radial dispersion modeler 1611 which creates a dispersion curve from measured data (e.g., flexural wave data and the far-field shear velocity $V_0$). Examples of the data which may be provided to the radial dispersion modeler 1611 is shown in Table 2 at block 312 below.

At block 312, a reference dispersion curve $s_0$ is generated based on the model parameters. For example, the reference dispersion curve $s_0$ can be determined by utilizing the far field shear velocity $V_0$ and constructing flexural wave phase velocities at various wavelengths with an acoustic wave propagation simulation method. Such an acoustic propagator may be determined from physical theory or implemented via numerical methods based on the model parameters such as one or more parameters depicted in Table 1.

Each of the model parameters of Table 1 may be determined at blocks 309 and 310 so that at block 312 modeled flexural wave phase velocities, as in Table 1, may be produced to acquire a reference dispersion curve $s_0$. Values for estimated shear velocities, as shown in Table 2 for a formation with the parameters of Table 1, may be determined by performing operations depicted and described with reference to FIGS. 3 and 4.

TABLE 1

| Symbol | Parameter | Value | Unit |
| --- | --- | --- | --- |
| a | Borehole radius | 0.1 | m |
| $\xi_a$ | Outer radius of alteration zone normalized by borehole radius | 3 | — |
| $\xi_{domain}$ | Outer radius of model domain normalized by borehole radius | 10 | — |
| Vp | P-wave velocity of rock formation | 2400 | m/s |
| $V_0$ | S-wave velocity of far-field virgin formation | 1200 | m/s |
| $V_m$ | Mud velocity | 1500 | m/s |
| $Rho_m$ | Mud density | 1000 | kg/m³ |
| Rho | Rock density | 2000 | kg/m³ |
| M | Number of data samples | 20 | — |
| N | Number of layers in alteration zone | 10 | — |
| $t_1$ | Threshold 1 for QC | 0.1 | — |
| $t_2$ | Threshold 2 for QC | 0.01 | — |

To construct the reference dispersion curve $s_0$, an isotropic, homogeneous formation is presumed and analytical equations for the displacement potential are solved to find the mode associated with the far-field shear velocity $V_0$. Acoustic energy with varying frequency or wavelength will be affected with varying intensity by the formation.

As part of generating and/or post-processing, the measured and reference flexural wave dispersion curves are parametrized by a normalized wavelength $\eta$. The normalized wavelength $\eta$ is computed as follows:

$$\eta(f) = \frac{v(f)}{fa} \quad (1)$$

where f is frequency, a is the borehole radius, and v(f) is flexural wave phase velocity for a given frequency. The value of v(f) is given by the flexural phase velocities in each dispersion curve.

At block 314, an alteration zone with multiple layers is defined. An alteration zone can be defined, in part, based on a borehole radius, a, and expected or measured formation alteration parameters. Radial distance from the tool axis is non-dimensionalized by defining a normalized radial distance variable $\xi$ as:

$$\xi = \frac{r}{a} \quad (2)$$

Where r is radial distance from the tool axis and a is the borehole radius. The area within a radius $\xi_a$ is an alteration zone and $\xi_a$ is referred to as the "alteration depth." The alteration depth may be defined based on downhole parameters. For example, it may be typical to assign a value of two to three times the borehole radius a to the alteration radius $\xi_a$. A number N of layers are also defined within the alteration zone as in FIG. 1. Each layer is an annular region having a uniform width h. That is, the $i^{th}$ layer is a band of width h centered at a radius $\xi_i$ from the tool axis which is defined as:

$$\xi_i = 1 + h\left(i - \frac{1}{2}\right) \quad (3)$$

Each layer within the alteration zone is allowed a constant perturbation of flexural wave shear velocity. The N layers thus correspond to the N shear velocity perturbation functions described in further detail with reference to FIG. 4 as part of a process for generating a linear approximation model.

At block 314, a fractional perturbation value is also defined. A priori information can be used to estimate the magnitude of the perturbation value. For example, a perturbation of the expected total variation in velocity from the borehole wall to the far-field formation, divided by the total number of layers N, may be utilized as an initial estimate. For example, if the previous depth resulted in a radial shear profile with a minimum and maximum velocity of 2300 and 2500 m/s, then for N=10, a perturbation of (200/2400)/10=0.01.

Two types of linearity/non-linearity constraints are applied in the method to optimize linearity and accuracy of the final radial shear velocity profile. The first type of linearity constraint applies to the independence among the N kernels g1, g2, etc. This linearity constraint is controlled by N and the perturbation value $u_i^0$. The linearity can be assessed with quality control (QC) metrics before the radial shear velocity profile is determined. If the kernels are not sufficiently linear, such as may be determined via a linearity threshold determination, a different set of N and $u_i^o$ are selected, resulting in an automated optimization of N and $u_i^o$. The selection and autonomously guided re-selection of the N and $u_i^o$ values enables radial shear velocity profiling to be performed concurrently in real-time with the collection and processing of flexural wave phase velocity information.

A second type of linearity is determined in terms of the misfit between the estimated phase velocities and the observed phase velocities. This second linearity constraint relates to how well-behaved the misfit function is between the correct model and the initial model. If the misfit function is non-linear, which is more likely to happen for large velocity variations, the resulting inversion result may reduce the misfit, but significant misfit may still exist. If after computing the radial shear velocity profile the predicted phase velocities do not match the measured phase velocities, the predicted phase velocities can be used as the reference curve $s_0$ at 312 for a second iteration of the workflow.

At block 316, a dispersion modeling system, such as dispersion modeler 202, generates a linear approximation model that includes reference and measured flexural wave information that can be utilized to solve for a radial shear wave slowness profile. The dispersion modeler generates a set of sensitivity kernels each one associated with one of the N layers of the alteration zone. In some embodiments, the sensitivity kernels are computed in accordance with ratios between each of a set of wavelength dependent and layer dependent flexural wave perturbation values and an approximated shear velocity perturbation value. The linear approximation model also includes flexural wave perturbation values based on the normalized measured and reference flexural wave dispersions.

At block 318, the linearity of the kernels are assessed with QC metrics $e_1$ and $e_2$. FIG. 14 shows an example workflow for this process. The minimum and maximum frequencies, after convening to normalized wavelength, become etaMin and etaMax, defining the target range of high-quality available data. The objective of this block is to find the smallest value of N and the largest value of $u_i^o$ that produces a relative number of linear data points within this target range that exceeds a proportionality threshold, which is 0.95 in the depicted example. The two graphs on the right are cumulative density functions that integrate the empirical probability distribution functions with respect to $e_1$ and $e_2$, respectively. Where the $e_1^*$ threshold line intersects the CDF is the proportion of selected values that are linear with respect to $e_1$. Where the $e_2^*$ threshold line intersects the CDF is the proportion of selected values that are linear with respect to $e_2$. The chosen N and $u_i^o$ leads to only 85% and 87% linearity, with respect to $e_1$ and $e_2$ thresholds. If, as determined at inquiry block 320, some combination of the proportions are less than CDF threshold, then control returns to block 314 with selection of a different pair of N and $u_i^o$.

At block 322, a linear equation inversion processor, such as inversion unit 234, performs inversion processing on the linear approximation model to generate a set of shear velocity versus radius perturbation values. A linear approximation model may be generated as a linear least squares approximation in which the shear velocity perturbations for each alteration zone layer are the unknowns/variables to be solved for. The total shear velocity perturbation function may be denoted by $u(\xi)$ and defined as:

$$u(\xi) = \frac{\partial v(\xi)}{V_0} \quad (4)$$

Where $V_0$ is the far-field shear velocity and $\partial V(\xi)$ is the difference between shear velocity at $\xi$ and $V_0$. That is, the total shear velocity perturbation function may be taken as the difference of true shear velocity against the shear velocities of the reference shear velocity dispersion curve for each $\xi$ normalized by $V_0$.

The total shear velocity perturbation function can be divided into N shear velocity perturbation functions containing the variation of shear velocities within each layer in an alteration zone. The perturbation within each layer is assumed to be constant; this simplifies the approximation scheme by allowing the total perturbation function to be written as a sum of N terms comprising constants $u_i$ multiplied by a rectangular function centered about the $i^{th}$ layer of an alteration zone:

$$u(\xi) = \sum_{i=1}^{N} u_i \Pi\left(\frac{\xi - \xi_i}{h}\right) \quad (5)$$

where $\Pi$ is the rectangular function and $u_i$ is the constant shear velocity perturbation for each layer i. Thus, $u(\xi)$ is taken to be a step function acquired by summation of the constant perturbations $u_i$ allowed in each layer i.

The construction of the linear approximation model is based, in part, on flexural wave perturbation functions that represent the deviation of the measured dispersion curve from the reference dispersion curve $s_0$ in normalized wavelength. A flexural wave perturbation function, $m(\eta)$, is given by:

$$m(\eta) = \frac{\partial s_0(\eta)}{s_0(\eta)}\bigg|_\eta \quad (6)$$

That is, the perturbation function may be taken as the difference of the measured flexural wave velocity dispersion curve $s_d$ and reference flexural wave velocity dispersion curve $s_0$ and normalized by the value of $s_0$ at a fixed $\eta$. These values are constructed such as at block 404 of FIG. 4 by sampling the measured flexural wave phase velocity dispersion curve $s_d$ at selected $\eta$ values and performing the appropriate operations to acquire samples of $m(\eta)$.

In some embodiments, an assumption is made that perturbation in dispersion curves is caused by perturbations in shear velocity; thus, the relationship between $m(\eta)$ and $u(\xi)$ is given by $$m(\eta) = \int_1^a G_i(\eta, \xi) u(\xi) d\xi \quad (7)$$

Where $G_i$ is a Green's function for the layer i. By replacing the shear velocity perturbation function with rectangular functions corresponding to each layer i as above, a sum of N integrals may be determined. Each of these integrals correspond to a layer i among N layers and define the perturbation functions. Because the total shear velocity perturbation function is separable by layer, the relationship between $m(\eta)$ and $u(\xi)$ is given by:

$$m_i(\eta) = u_i^0 \int_{\xi_i - h/2}^{\xi_i + h/2} G_i(\eta, \xi) d\xi \quad (8)$$

Where $m_i(\eta)$ is the flexural wave phase velocity dispersion perturbation due to the formation shear velocity perturbation $u_i^0$ for the $i^{th}$ layer of the alteration zone. A first approximation $u_i^0$ is made to determine the unknown shear velocity perturbations $u_i$. Values of $u_i^0$ may be determined based on expected total shear velocity perturbation divided by V0 divided by the number of layers N, evaluated based on the results of the heuristic arguments below, or determined via modeling or simulation. Note that $u_i^0$ may be determined via an optimization method using the analysis depicted in FIG. 14.

By allowing a constant perturbation of shear velocity in each layer within the alteration zone, each $m_i(\eta)$ is proportional to an integrated Green's function for the layer i. Each Green's function, when integrated over the appropriate layer, is defined to be a sensitivity kernel. Each sensitivity kernel represents the mapping from radially dependent shear velocity (for a particular layer i) to wavelength dependent flexural wave phase velocity (with wavelength in units of $\eta$).

The shear velocity perturbation values may be further evaluated for accuracy using a model fit process beginning at block 324 at which a determination is made of whether the generated shear velocity perturbations result in flexural wave phase velocity information that matches the measured flexural wave information. In response to differences between these two sets of information exceeding a threshold, the linear approximation model is re-generated using another reference flexural wave velocity dispersion such as a best first iteration model that it also generated based in part on the far-field shear velocity. If the model fit is unsuitable (e.g., out of threshold limit) as determined at block 324 and additional parameter space exists, a replacement reference model is generated as control returns to block 312.

FIG. 4 is a flow diagram illustrating operations and functions for generating and processing a linear approximation model to generate a radial shear velocity profile, according to some embodiments. The operations and functions depicted in FIG. 4 may be performed by one or more of the system, subsystems, and components illustrated and described with reference to FIGS. 1-3 and 15-17.

At block 402, a model generator, such as model generator 232, determines a range of wavelength values for sampling. The first input to this is the frequency content of the measured dispersion data. A minimum and maximum frequency are used as limiting parameters. Next, two heuristic arguments are used to select a range of normalized wavelengths to sample dispersion data for $m_i(\eta)$ values from measured flexural waves. This analysis and results thereof are illustrated in FIG. 14. By sampling selected values of $\eta$, the normalized wavelength is made discrete to simplify further calculations.

The first heuristic argument relates to measuring the spread of sensitivity kernels $g_i$, which ensures a non-trivial determinant in the system of linear equations. The first heuristic argument is given by:

$$e_1(\eta) = \frac{\sigma(g_i(\eta))}{\max(\sigma(g_i(\eta)))} \qquad (9)$$

Where $\sigma(g_i(\eta))$ is the standard deviation of the sensitivity kernels $g_i$ at a fixed value of $\eta$. The value of the first heuristic $e_1$ may be used to select a bound for the sampled $\eta$ range. For example, if $e_1$ is selected to be greater than 0.1, then only those values of $\eta$ which results in a $e_1$ value greater than or equal to 0.1 are viable for sampling $m(\eta)$. The value of $e_1$ may be selected based upon the downhole parameters. Alternatively, the value of the first heuristic $e_1$ may be used to change the selected number of layers (N) and/or the selected perturbation value ($u_i^0$).

The second heuristic argument is determined based on the percent change of the sum of sensitivity kernels from the total sensitivity kernel acquired by allowing each layer to perturb at the same time instead of one-by-one. This heuristic argument is given by:

$$e_2(\eta) = \frac{\Sigma_i g_i(\eta) - g(\eta)}{|g(\eta)|} \qquad (10)$$

The second heuristic argument measures the quality of the linearity approximation and may be used to select a lower bound for the sampled $\eta$ range. It stands to reason that, if the linearity approximation is poor then a smaller $\eta$ range can be employed to reduce error. Alternately, if the linearity approximation is good, then a larger $\eta$ range can be employed without incurring significant error. The value of $e_2$ may be selected to be less than a constant value. For example, if $e_2$ is selected to be less than 0.2, then only those values of $\eta$ which give $e_2$ less than or equal to 0.2 are viable for sampling $m(\eta)$. The value of $e_2$ may be selected based upon the downhole parameters. Alternatively, the value of the second heuristic $e_2$ may be used to change the number of layers assumed (N) and/or the perturbation size ($u_i^0$).

Each of the two heuristics arguments $e_1$, $e_2$ provides a range of appropriate $\eta$ values (or N and $u_i^0$ values) to sample $m(\eta)$ values from the measured flexural wave dispersion curve $s_d$ which is bounded on one side. By taking the intersection of these two ranges, one may acquire an appropriate range of $\eta$ values for sampling which is bounded above and below. Examples of the two heuristic arguments are show in FIGS. 7-11. Alternatively. N and $u_i^0$ can be changed until linearity is achieved in the frequency band of interest.

Figure 7:
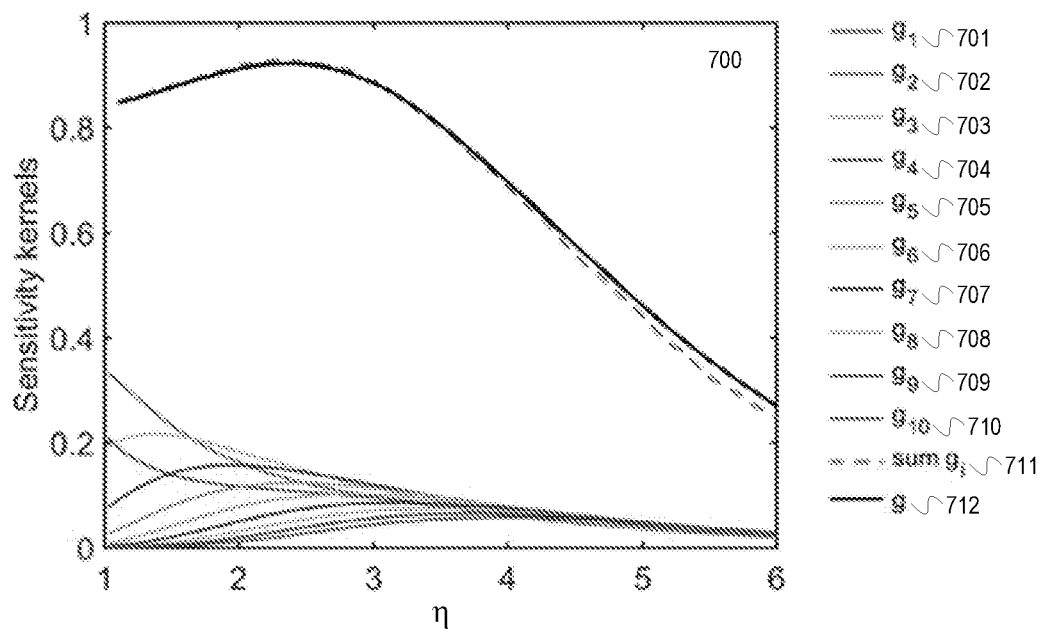
FIG. 7 depicts a quality control measure for testing the error incurred by assuming linearity in the shear velocity model for sensitivity kernels, according to some embodiments.

FIG. 7 depicts a quality control measure for testing the error incurred by assuming linearity in the shear velocity model for sensitivity kernels, according to some embodiments. A plot 700 includes ten sensitivity kernels $g_1$-$g_{10}$ (701-710) along with their sum 711 and a total sensitivity kernel g 712 acquired by allowing each layer in an alteration zone to be perturbed simultaneously. The deviation of the sum 711 from the total sensitivity kernel g 712 indicates the degree of nonlinearity present in the true shear velocity dispersion. Where the deviation of the two curves occurs is coincident with the maximum range of $\eta$ detected from applying the $e_1$ and $e_2$ metrics.

Figure 8:
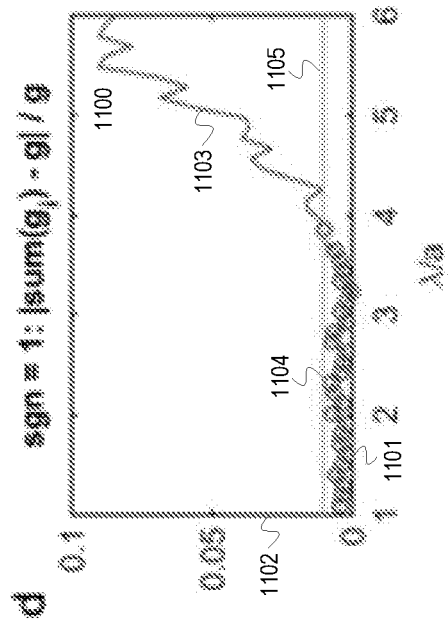
FIG. 8 depicts the use of the first heuristic argument to select a bound for normalized wavelength when sampling measured shear velocities with monotonically decreasing shear velocity perturbations, according to some embodiments.

FIG. 8 depicts the use of the first heuristic argument to select a bound for normalized wavelength when sampling measured shear velocities with monotonically decreasing shear velocity perturbations, according to some embodiments. A plot 800 includes an x-axis 801 denoting values of normalized wavelength $\eta$ and a y-axis 802 denoting values of the first heuristic $e_1$. A line 803 depicting $e_1(\eta)$ is marked with a set of calculated $e_1$ values 804 and intersects with a threshold 805. As at block 408, only those value of $\eta$ which provide $e_1$ values above the threshold 805. For this example, a lower bound has been provided for $e_1$ and the allowable values have been indicated with circles over the $e_1$ values 804. As can be seen in FIG. 8, the allowable $\eta$ values are those less than 3.5; thus, an acceptable range of $\eta$ values may be determined by taking an intersection of values less than 3.5 and values determined by the second heuristic $e_2$ as in FIG. 10.

Figure 9:
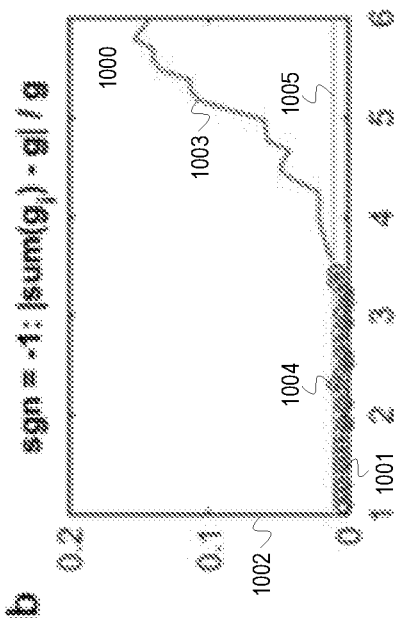
FIG. 9 depicts the use of the first heuristic argument to select a bound for normalized wavelength when sampling measured shear velocities with monotonically increasing shear velocity perturbations, according to some embodiments.

FIG. 9 depicts the use of the first heuristic argument to select a bound for normalized wavelength when sampling measured shear velocities with monotonically increasing shear velocity perturbations, according to some embodiments. A plot 900 includes an x-axis 901 denoting values of normalized wavelength η and a y-axis 902 denoting values of the first heuristic $e_1$. A line 903 depicting $e_1(\eta)$ is marked with a set of calculated $e_1$ values 904 and intersects with a threshold 905.

For this example, a lower bound has been provided for $e_1$ and the allowable values have been indicated with circles over the $e_1$ values 904. As can be seen in FIG. 9, the allowable η values are those less than 3.5; thus, an acceptable range of η values may be determined by taking an intersection of values less than 3.5 and values greater than another number determined by the second heuristic $e_2$ as in FIG. 11.

Figure 10:
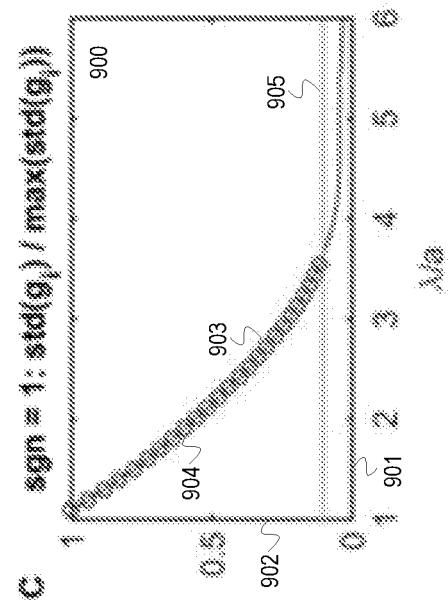
FIG. 10 depicts the use of the second heuristic argument to select a bound for normalized wavelength when sampling measured shear velocities with monotonically decreasing shear velocity perturbations, according to some embodiments.

FIG. 10 depicts the use of the second heuristic argument to select a bound for normalized wavelength when sampling measured shear velocities with monotonically decreasing shear velocity perturbations, according to some embodiments. A plot 1000 includes an x-axis 1001 denoting values of normalized wavelength η and a y-axis 1002 denoting values of the first heuristic $e_1$. A line 1003 depicting $e_1(\eta)$ is marked with a set of calculated $e_1$ values 1004 and intersects with a threshold 1005.

For this example, a lower bound has been provided for $e_1$ and the allowable values have been indicated with circles over the $e_2$ values 1004. As can be seen in FIG. 10, the allowable η values are those less than 3.5. In reference to FIG. 8, an acceptable range of η values may be determined by taking an intersection of values less than 3.5 as dictated by the first heuristic $e_1$ and values less than 3.5 as determined by the second heuristic $e_2$. The acceptable range in this situation would be [0,3.5], that is, all η values from 0 to 3.5.

Figure 11:
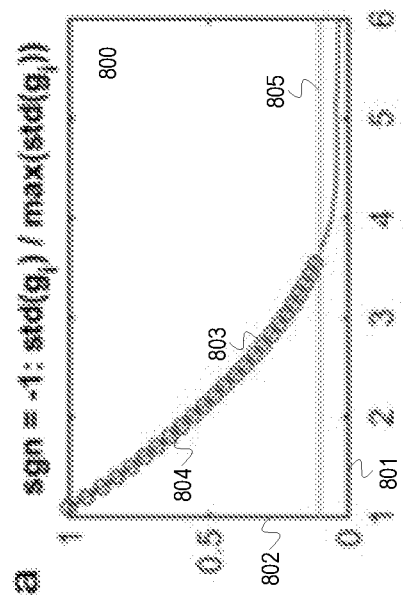
FIG. 11 depicts the use of the second heuristic argument to select a bound for normalized wavelength when sampling measured shear velocities with monotonically increasing shear velocity perturbations, according to some embodiments.

FIG. 11 depicts the use of the second heuristic argument to select a bound for normalized wavelength when sampling measured shear velocities with monotonically increasing shear velocity perturbations. A plot 1100 includes an x-axis 1101 denoting values of normalized wavelength η and a y-axis 1102 denoting values of the first heuristic $e_2$. A line 1103 depicting $e_1(\eta)$ is marked with a set of calculated $e_2$ values 1104 and intersects with a threshold 1105.

For this example, a lower bound has been provided for $e_1$ and the allowable values have been indicated with circles over the $e_2$ values 1104. As can be seen in FIG. 11, the allowable η values are those less than 4. In reference to FIG. 9, an acceptable range of η values may be determined by taking an intersection of values less than 3.5 as dictated by the first heuristic $e_1$ and values less than 4 as determined by the second heuristic $e_2$. The acceptable range in this situation would be [0, 3.5], that is, all η values from 0 to 3.5. If the range of selected η values acquired from the two heuristics is unacceptable, then the N-layer alteration zone is re-define, using a different alteration radius $\xi_a$ and number of layers N and/or selecting new values for $u_i^o$.

At block 404, the selected range of η values are used to sample m(η) values from the measured flexural wave dispersion curve $s_d$. Specifically, for η values selected from the range defined by the heuristic arguments at block 402, a ratio is taken of the difference in the measured and reference phase velocities, $s_d$ and $s_0$, divided by the reference phase velocity of $s_0$ as specified by Eqn. 6. The number of sampled values M should be larger than the number of layers N. Each selected η value may be denoted $\eta_j$ where j is an integer between 1 and M. A vector with dimension 1×M may be formed containing each sampled phase velocity perturbation $m(\eta_j)$. The vector of sampled phase velocities perturbations $m(\eta_j)$ is part of a linear system of equations representing the relationship of phase velocity to shear velocity.

At block 406, sensitivity kernels are constructed from the relationship between the two types of perturbation functions. The relationship used to construct the sensitivity kernels $g_i$ is given by Eqn. 8. Dividing both sides of Eqn. 8 by $u_j^o$, the sensitivity kernels are defined by:

$$a. \quad g_i(\eta) = \int_{\xi_i-h/2}^{\xi_i+h/2} G_i(\eta, \xi)d\xi = \frac{m_i(\eta)}{u_1^0} \qquad (11)$$

The steps taken in blocks 402-406 to equate the ratio of the dispersion perturbation functions to the shear velocity perturbation functions with i sensitivity kernels approximates the true system with a linear system, reducing computational complexity but also introducing error for nonlinear systems.

For a linear system, the sum of N sensitivity kernels can be equated to a single sensitivity kernel g that corresponds to the entire alteration zone. This is the foundation for the second heuristic equation introduced at block 402 and shown in FIG. 7.

At block 408, a linear system of equations is constructed based on the sensitivity kernels. Once a set of sensitivity kernels have been acquired and flexural wave phase velocities have been sampled from $s_d$ and composed into the vector of perturbations $m(\eta_j)$, an inversion problem may be formulated. A linear system of equations relating shear velocity perturbation functions to flexural mode perturbation functions may be written as a system of equations for each wavelength value $\eta_j$ used to sample m(η):

$$\begin{pmatrix} g_1(\eta_1) & \cdots & g_N(\eta_1) \\ \vdots & \ddots & \vdots \\ g_1(\eta_M) & \cdots & g_N(\eta_M) \end{pmatrix} \begin{pmatrix} u_1 \\ \vdots \\ u_N \end{pmatrix} = \begin{pmatrix} m(\eta_1) \\ \vdots \\ m(\eta_M) \end{pmatrix} \qquad (12)$$

Where a matrix of sensitivity kernels maps phase velocity perturbations to shear velocity perturbations as a function of wavelength. The columns of the matrix enumerate the number of layers in the alteration zone while the rows enumerate each of the sampled wavelengths.

If the linearity assumption is accurate, then each of the equations in the linear system of equation 12 may be added or multiplied. A means of testing the linear approximation's accuracy based on adding sensitivity kernels (i.e., the second heuristic at block 406) is described below at FIG. 7.

At block 410, a monotonicity constraint is applied to the linear system of equations. Specifically, the shear velocity perturbation functions are constrained to be negative and monotonically increasing or positive and monotonically decreasing. By combining the monotonicity constraint with the linear system of equations in Eqn. 12, the inversion process for radial shear wave velocity perturbations is further simplified. The two monotonicity constraints are given by:

$$u_1 < u_2 < \ldots < u_n < 0 \qquad (13)$$

and $$u_1 > u_2 > \ldots > u_n > 0 \qquad (14)$$

The determination of which monotonicity constraint to use can be made by comparing $s_d$ (measured shear velocity dispersion values) to $s_0$ (reference shear velocity dispersion values) and determining whether $s_d$ is greater than or less than $s_0$ for all values of η, respectively. This is because strictly negative or strictly positive shear velocity perturbations would cause $s_d$ to be strictly less than or strictly greater than $s_0$, respectively. Examples of monotonically decreasing dispersions are depicted in FIGS. 5, 8, 9, and 12. Examples of monotonically increasing dispersions are depicted in FIGS. 6, 10, 11, and 13.

At block 412, the constrained least-squares problem may be solved by inversion to acquire shear velocity perturbation values $u_i$. This may be accomplished by a number of algorithms or methods. For example, one may employ Lagrange multipliers to estimate radial shear velocity perturbation values.

The solution to the inversion problem will yield shear velocity perturbations $u_i$ for each layer i in an alteration zone. Shear velocity values are then given by:

$$V_i = (1+u_i)V_0 \quad (15)$$

These shear velocity values may then be converted into slowness values $s_i$ by taking the inverse of each shear velocity:

$$s_i = \frac{1}{V_i} = \frac{1}{(1+u_i)V_0} \quad (16)$$

Where each slowness $s_i$ gives a slowness value for a layer i within an alteration zone of a formation. Thus, a radial shear slowness distribution curve may be determined from measured flexural waves. At block 414, S-wave dispersion generator, such as S-wave dispersion generator 236 computes corresponding radial shear wave velocity profiles (including slowness profiles) based on the shear velocity perturbation values. For example, the S-wave dispersion generator may determine the shear velocities for each of the N layers based on the far-field shear velocity and the perturbation values in accordance with the relation depicted in equation (15).

At block 416, formation analysis can be performed based on the determined radial shear wave velocity profile. Formation analysis may comprise hydrocarbon recovery operations. For example, drilling operations (such as steering) in the current borehole can be updated based on the determined radial slowness variation. In another example, drilling of a different or new borehole can be directed or modified based on the determined slownesses. Radial shear wave slowness profiles may be used to analyze deformities within the alteration zone, borehole stability, formation evaluation, and correct other algorithms for effects of the alteration zone. Radial shear slownesses may also be applied to stress inversions to acquire stress amplitudes for a formation surrounding a borehole.

FIG. 12 depicts a plot of monotonically increasing true and estimated radial shear wave slowness profiles (versus normalized radius), according to some embodiments. The radius ξ is normalized by borehole radius a. A plot 1200 includes an x-axis 1202 depicting values of normalized radius ξ and a y-axis 1204 depicting values of slowness in microseconds per foot. A line 1208 represents the true slowness profile while a dashed line 1206 shows an estimated slowness profile. The plot shows that the approximation scheme detailed by FIGS. 3 and 4 produced radial shear slowness profiles which are accurate.

At three times the borehole radius a, the values of both the true (1208) and estimated (1206) slowness profiles become constant. This is the far field, where the formation is unaffected by the imperfections of the alteration zone and slowness is equal to the inverse of the assumed far field velocity ($s=1/V_0$). Each plateau of curves 1206, 1208 corresponds to a layer within the alteration zone. To produce the shown radial shear slowness profile curves 1026, 1208, ten layers were allowed within the alteration zone.

FIG. 13 depicts a plot of monotonically decreasing true and estimated radial shear wave slowness profiles (versus normalized radius), according to some embodiments. The radius ξ is normalized by borehole radius a. A plot 1300 includes an x-axis 1302 depicting values of normalized radius ξ and a y-axis 1304 depicting values of slowness in microseconds per foot. A line 1308 represents a true slowness profile while a dashed line 1306 shows an estimated slowness profile. The plot shows that the approximation scheme detailed by FIGS. 3 and 4 produced radial shear slowness profiles which are accurate. FIG. 13 is similar to FIG. 12 and illustrates that the properties of FIG. 12 (step functions which approach the far field velocity for large radii) apply to both monotonically increasing and monotonically decreasing radial slowness profiles. Because slowness is the inverse of shear velocity, these properties apply to shear velocity dispersion curves as well.

In reference to FIGS. 12 and 13, Table 1 below lists the modeled (1206, 1306) and true (1208, 1308) shear velocities as shown for each of the ten layers in the alteration zones of the plots 1200, 1300: the left two columns detail monotonically decreasing values while the right two columns detail monotonically increasing values. Because each layer corresponds to a range of radii from the tool axis, Table 2 presents two sets of assumed and estimated radial shear velocity profiles.

TABLE 2

| Layers | Vs monotonically decreasing from near-to far-field (sgn = −1) | | Vs monotonically increasing from near-to far-field (sgn = 1) | |
| --- | --- | --- | --- | --- |
| | Model Vs (m/s) | Estimated Vs (m/s) | Model Vs (m/s) | Estimated Vs (m/s) |
| 1 | 1248 | 1255 | 1152 | 1150 |
| 2 | 1243 | 1241 | 1157 | 1158 |
| 3 | 1238 | 1236 | 1162 | 1162 |
| 4 | 1234 | 1233 | 1167 | 1164 |
| 5 | 1229 | 1231 | 1171 | 1168 |
| 6 | 1224 | 1229 | 1176 | 1184 |
| 7 | 1219 | 1217 | 1181 | 1185 |
| 8 | 1214 | 1211 | 1186 | 1185 |
| 9 | 1210 | 1205 | 1190 | 1186 |
| 10 | 1205 | 1201 | 1195 | 1186 |

The number of layers used may be varied. With reference to FIG. 1, the depicted cross section is intended to illustrate operations of radially profiling shear velocities in an alteration zone as depicted in FIGS. 3-4. The four layers 110, 112, 114, and 116 are illustrative; as the number of layers N increases the approximation will increase in accuracy. A balance can be established between approximation accuracy and computational difficulty when selecting an optimal number of layers N. An in situ application of the operations described herein may employ any number of layers N as needed.

As the number of layers N in an alteration zone, such as alteration zone 104, increases, the width of each step in the shear velocity dispersion curve can decrease. As N approaches infinity, a continuous shear velocity dispersion curve can be recovered; however, this would take infinite time to model and compute, and so a finite number of layers is used with N being set depending on the type of application, type of formation, type of mud, etc. For example, as alteration zone radius increases, the optimal number of layers N may increase in turn.

Example Wireline System

FIG. 15 depicts a diagram of a wireline well logging system and the underlying formation, according to some embodiments. An oil derrick 1502 on a platform 1501 on a surface 1503 lowers a wireline tool 1504 on a cable 1515 with a kelly 1505 and a rotary table 1514 into a borehole 1506 surrounded by a formation 1508. The wireline tool 1504 comprises a dipole acoustic tool 1510 and a tool array 1512. The wireline tool 1504 is connected to a computer 1522 of a logging facility 1524.

The derrick 1502 can lower the wireline tool 1504 to a given depth in the borehole 1506 to perform formation evaluation. After the wireline tool 1504 is positioned at a given depth in the borehole 1506, the dipole acoustic tool 1510 emits a signal 1520 into the formation 1508. The formation 1508 can include an alteration zone having multiple layers caused by drilling fluids, stress relief, etc. An example of an alteration zone is depicted in FIG. 1. The wave properties of the signal 1520 allow non-destructive testing of composition of the formation 1508. Wave properties may include wavelength, amplitude, waveform, etc.

The dipole acoustic tool 1510 may include multiple broadband dipole sources, as well as a number of acoustic receivers which are equally spaced about the wireline tool 1504. Use of the dipole acoustic tool 1510 may employ cross dipole logging, which entails firing one dipole at a time and performing measurements on the returned signal.

The tool array 1512 may also perform measurements on formation materials 1507 in the formation 1508 as needed to create a model of acoustic properties of the formation 1508. Such measurements may include values of rock density and mud density, borehole radius, mud speed, and P-wave velocity. These measurements may be used to create a shear velocity radial profile of the formation 1508 by the computer 1522 and/or other computers downhole or at the surface. Systems and operations for generating a shear velocity radial profile are depicted in FIGS. 3-4.

Example Drilling System

FIG. 16 depicts an example drilling system, according to some embodiments. A drilling system 1680 creates a borehole 1616 in a formation 1684. A derrick 1604 on a drilling platform 1602 lowers a bit 1614 attached to a drill string 1608 into the formation 1684. The drill string 1608 may be supported by a kelly 1610 as well as a traveling block 1606. A pump 1620 pumps drilling fluid from a retention pit 1624 through a feed pipe 1622 into the borehole 1616.

An LWD/MWD tool 1626 may perform measurements on the formation 1684 as the drilling system 1680 operates. These measurements may be communicated to a surface receiver 1630 by a telemetry element 1628. The surface receiver 1630 sends measured data to a computer 1632 for processing.

The LWD/MWD tool 1626 may include a dipole acoustic tool, NMR logging tools or ultrasonic calipers. The measurements performed by the LWD/MWD tool 1626 can be used to formulate a model of the formation 1684 as at blocks 310 and 312 for radially profiling shear velocities as detailed in FIGS. 3 and 4.

Example Computer

Figure 17:
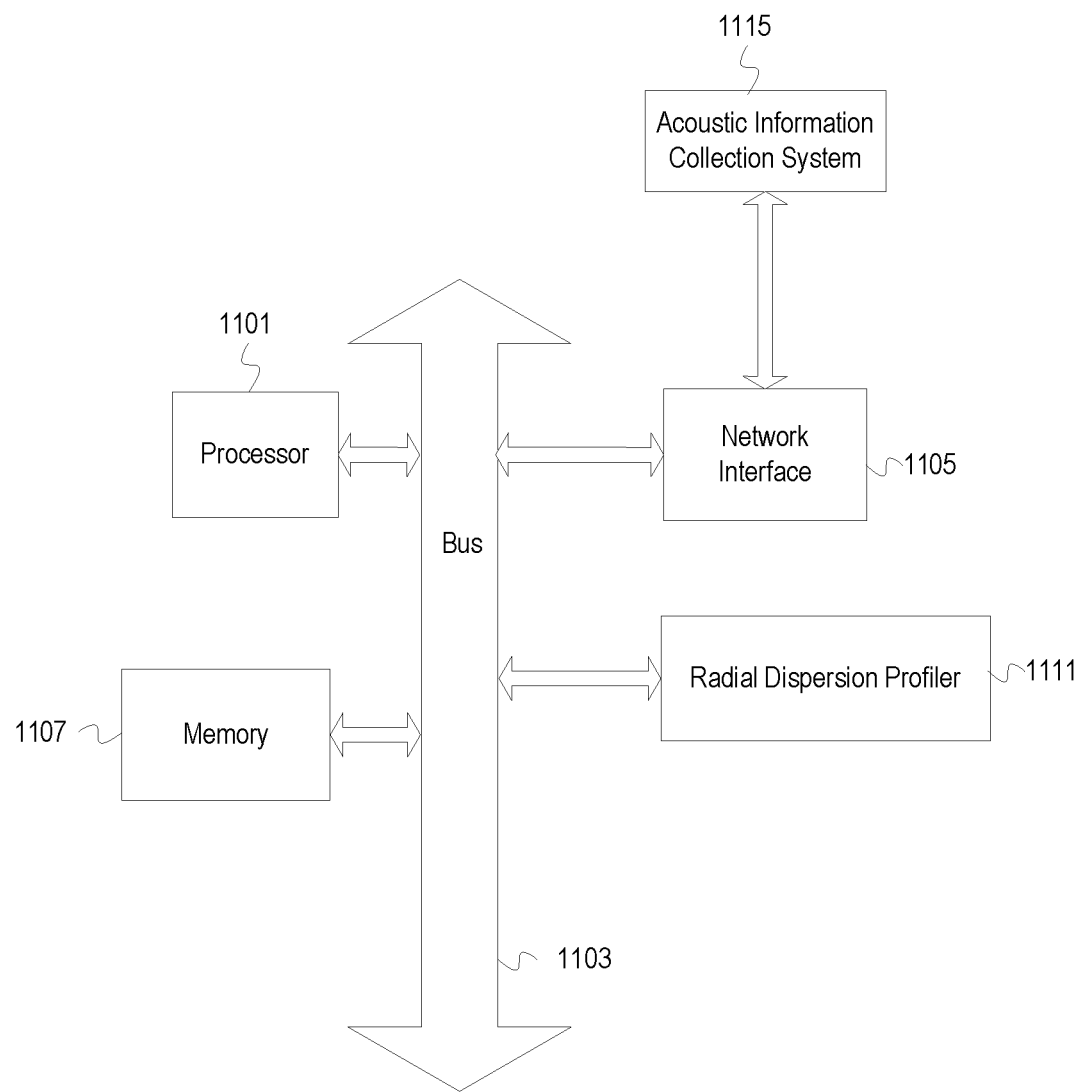
FIG. 17 depicts an example computer system that implements shear velocity profiling, according to some embodiments.

FIG. 17 depicts an example computer, according to some embodiments. The computer system includes a processor 1701 (possibly including multiple processors, multiple cores, multiple nodes, and/or implementing multi-threading, etc.). The computer system includes a memory 1707. The memory 1707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1503 (e.g., PCI, ISA, PCI-Express, Hyper-Transport® bus, InfiniBand® bus, NuBus, etc.) and a network interface 1705 (e.g., a Fiber Channel interface, an Ethernet interface, an internet small computer system interface, SONET interface, wireless interface, etc.).

The system also includes a radial dispersion modeler 1711, which may be hardware, software, firmware, or a combination thereof. For example, the radial dispersion modeler 1711 can be instructions executable by the processor 1701. Any one of the previously described functionalities may be partially (or entirely) implemented in hardware and/or on the processor 1701. For example, the functionality may be implemented with an application specific integrated circuit, in logic implemented in the processor 1701, in a co-processor on a peripheral device or card, etc. The radial dispersion modeler 1711 profiles the dispersion of shear velocities in a formation radially (as described above). Further, realizations may include fewer or additional components not illustrated in FIG. 17 (e.g., video cards, audio cards, additional network interfaces, peripheral devices, etc.). The processor 1701 and the network interface 1705 are coupled to the bus 1703. Although illustrated as being coupled to the bus 1503, the memory 1707 may be coupled to the processor 1701.

Variations

While the aspects of the disclosure are described with reference to various implementations and exploitations, it will be understood that these aspects are illustrative and that the scope of the claims is not limited to them. In general, techniques for radial dispersion profiling as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 314 and 316 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device. Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

Embodiment 1: A method comprising: generating a measured flexural wave velocity dispersion based on measured flexural wave velocities; determining formation properties including determining a far-field shear velocity based, at least in part, on the measured flexural wave velocity dispersion; generating a reference flexural wave velocity dispersion based on the determined formation properties; generating a linear approximation model for an alteration zone having multiple layers, said generating a linear approximation model including generating a set of wavelength dependent perturbation values based on differences between wavelength-correspondent velocities in the measured flexural wave dispersion curve and the reference flexural wave dispersion curve, and generating a respective sensitivity kernel for each of the multiple layers based on ratios between each of a set of wavelength dependent and layer dependent flexural wave perturbation values and an approximated shear velocity perturbation value; processing the linear approximation model to determine a set of shear velocity perturbation values based on the wavelength dependent perturbation values and the sensitivity kernels; and determining a respective shear velocity for each of the multiple layers based on the far-field shear velocity and the shear velocity perturbation values.

Embodiment 2: The method of Embodiment 1, further comprising applying a linearity constraint to the generation of sensitivity kernels including, determining whether a first set of generated sensitivity kernels satisfy a linearity threshold; in response to the first set of sensitivity kernels not satisfying the linearity threshold, selecting at least one of a second number of layers and a second approximated shear velocity perturbation value: and re-generating the linear approximation model using at least one of the second number of layers and the second approximated shear velocity perturbation value.

Embodiment 3: The method of Embodiment 1 or 2, further comprising generating predicted flexural wave phase velocities resulting from the determined radially shear wave velocity profiles; comparing the predicted flexural wave phase velocities with the measured flexural wave velocities; and in response to differences between the predicted flexural wave velocities and the measured flexural wave velocities exceeding a threshold, generating the linear approximation model using another reference flexural wave velocity dispersion.

Embodiment 4: The method of any one of Embodiments 1-3, wherein said determining the far-field shear velocity comprises generating a low-frequency asymptote of the measured flexural wave velocity dispersion and determining the far-field shear velocity as corresponding to an asymptotic limit of the low-frequency asymptote.

Embodiment 5: The method of any one of Embodiments 1-4, wherein said generating a measured flexural wave velocity dispersion and said generating a reference flexural wave velocity dispersion comprise: determining frequency dependent dispersions of the measured flexural wave velocities and the reference flexural wave velocities; and normalizing the frequency dependent dispersions based on a ratio of flexural wave wavelength and a borehole radius value.

Embodiment 6: The method of any one of Embodiments 1-5, wherein said generating a set of wavelength dependent perturbation values comprises applying a flexural mode perturbation function to the measured flexural wave velocity dispersion and the reference flexural wave velocity dispersion, wherein the flexural mode perturbation function specifics flexural mode perturbation values, m, in accordance with the relation, $$m(\eta) = \frac{(s_d - s_0)}{s_0}\bigg|_\eta$$

where $s_d$ represents measured flexural wave velocity, $s_0$ represents reference flexural wave velocity, and $\eta$ represents wavelength normalized by a specified radial distance.

Embodiment 7: The method of any one of Embodiments 1-6, wherein said generating a respective sensitivity kernel for each of the multiple layers comprises: for each of the multiple layers, generating a flexural mode perturbation dispersion as a function of normalized wavelength: and for each of a selected sampling range of normalized wavelength values, computing a sensitivity kernel as the ratio between a flexural mode perturbation value and the approximated shear velocity perturbation value.

Embodiment 8: The method of any one of Embodiments 1-7, wherein said processing the linear approximation model to determine a set of shear velocity perturbation values comprises determining the set of shear velocity perturbation values as an inversion function of the wavelength dependent perturbation values and the shear velocity sensitivity kernels.

Embodiment 9: The method of any one of Embodiments 1-8, wherein said determining a set of shear velocities comprises for each of a respective one of the multiple layers, computing a shear velocity in accordance with the relation, $$V_i = (1 + u_i)V_0,$$

where $V_i$ represents the shear velocity of the $i^{th}$ annular layer, $u_i$ represents the shear velocity perturbation of the $i^{th}$ annular layer, and $V_0$ represents the far-field shear velocity.

Embodiment 10: The method of any one of Embodiments 1-9, emitting, by a dipole acoustic source within a borehole, acoustic energy into a formation; and measuring, by an acoustic receiver, velocities of flexural waves generated by the acoustic energy.

Embodiment 11: An apparatus comprising: a processor, and a machine-readable medium having program code executable by the processor to cause the apparatus to, generate measured flexural wave velocity dispersion based on measured flexural wave velocities; determine formation properties including determining a far-field shear velocity based, at least in part, on the measured flexural wave velocity dispersion; generate a reference flexural wave velocity dispersion based on the determined formation properties: generate a linear approximation model for an alteration zone having multiple layers, said generating a linear approximation model including: generating a set of wavelength dependent perturbation values based on differences between wavelength-correspondent velocities in the measured flexural wave dispersion curve and the reference flexural wave dispersion curve; and generating a respective sensitivity kernel for each of the multiple layers based on ratios between each of a set of wavelength dependent and layer dependent flexural wave perturbation values and an approximated shear velocity perturbation value: process the linear approximation model to determine a set of shear velocity perturbation values based on the wavelength dependent perturbation values and the sensitivity kernels; and determine a respective shear velocity for each of the multiple layers based on the far-field shear velocity and the shear velocity perturbation values.

Embodiment 12: The apparatus of Embodiment 11, wherein said program code executable by the processor to cause the apparatus to generate a linear approximation model includes program code executable by the processor to cause the apparatus to select a first number of layers and a first approximated shear velocity value, said apparatus further comprising program code executable by the processor to cause the apparatus to: apply a linearity constraint to the generation of sensitivity kernels including, determining whether a first set of generated sensitivity kernels satisfy a linearity threshold; in response to the first set of sensitivity kernels not satisfying the linearity threshold, selecting at least one of a second number of layers and a second approximated shear velocity perturbation value; and re-generating the linear approximation model using at least one of the second number of layers and the second approximated shear velocity perturbation value.

Embodiment 13: The apparatus of any one of Embodiments 11-12, further comprising program code executable by the processor to cause the apparatus to: generate predicted flexural wave phase velocities resulting from the determined radially shear wave velocity profiles; compare the predicted flexural wave phase velocities with the measured flexural wave velocities; and in response to differences between the predicted flexural wave velocities and the measured flexural wave velocities exceeding a threshold, generate the linear approximation model using another reference flexural wave velocity dispersion.

Embodiment 14: The apparatus of any one of Embodiments 11-13, wherein the program code executable by the processor to cause the apparatus to determine the far-field shear velocity comprises program code executable by the processor to cause the apparatus to generate a low-frequency asymptote of the measured flexural wave velocity dispersion and determining the far-field shear velocity as corresponding to an asymptotic limit of the low-frequency asymptote.

Embodiment 15: The apparatus of any one of Embodiments 11-14, wherein the program code executable by the processor to cause the apparatus to generate a measured flexural wave velocity dispersion and generate a reference flexural wave velocity dispersion comprises program code executable by the processor to cause the apparatus to: determine frequency dependent dispersions of the measured flexural wave velocities and the reference flexural wave velocities; and normalize the frequency dependent dispersions based on a ratio of flexural wave wavelength and a borehole radius value.

Embodiment 16: The apparatus of any one of Embodiments 11-15, wherein the program code executable by the processor to cause the apparatus to generate a set of wavelength dependent perturbation values comprises program code executable by the processor to cause the apparatus to apply a flexural mode perturbation function to the measured flexural wave velocity dispersion and the reference flexural wave velocity dispersion, wherein the flexural mode perturbation function specifies flexural mode perturbation values, m, in accordance with the relation, $$m(\eta) = \frac{(s_d - s_0)}{s_0}\bigg|_\eta$$

where $s_d$ represents measured flexural wave velocity, $s_0$ represents reference flexural wave velocity, and $\eta$ represents wavelength normalized by a specified radial distance.

Embodiment 17: The apparatus of any one of Embodiments 11-16, wherein the program code executable by the processor to cause the apparatus to generate a respective sensitivity kernel for each of the multiple layers comprises program code executable by the processor to cause the apparatus to: for each of the multiple layers, generate a flexural mode perturbation dispersion as a function of normalized wavelength; and for each of a selected sampling range of normalized wavelength values, determine a sensitivity kernel as the ratio between a flexural mode perturbation value and the approximated shear velocity perturbation value.

Embodiment 18: The apparatus of any one of Embodiments 11-17, wherein the program code executable by the processor to cause the apparatus to process the linear approximation model to determine a set of shear velocity perturbation values comprises program code executable by the processor to cause the apparatus to determine the set of shear velocity perturbation values as an inversion function of the wavelength dependent perturbation values and the shear velocity sensitivity kernels.

Embodiment 19: The apparatus of any one of Embodiments 11-18, wherein the program code executable by the processor to cause the apparatus to determine a set of shear velocities comprises program code executable by the processor to cause the apparatus to, for each of a respective one of the multiple layers, compute a shear velocity in accordance with the relation, $$V_i = (1+u_j)V_0,$$

where $V_i$ represents the shear velocity of the $i^{th}$ annular layer, $u_j$ represents the shear velocity perturbation of the $i^{th}$ annular layer, and $V_0$ represents the far-field shear velocity.

Embodiment 20: One or more non-transitory machine-readable media comprising program code for profiling acoustic shear velocities in a borehole, the program code to, generate measured flexural wave velocity dispersion based on measured flexural wave velocities; determine formation properties including determining a far-field shear velocity based, at least in part, on the measured flexural wave velocity dispersion; generate a reference flexural wave velocity dispersion based on the determined formation properties; generate a linear approximation model for an alteration zone having multiple layers, said generating a linear approximation model including, generating a set of wavelength dependent perturbation values based on differences between wavelength-correspondent velocities in the measured flexural wave dispersion curve and the reference flexural wave dispersion curve; and generating a respective sensitivity kernel for each of the multiple layers based on ratios between each of a set of wavelength dependent and layer dependent flexural wave perturbation values and an approximated shear velocity perturbation value: process the linear approximation model to determine a set of shear velocity perturbation values based on the wavelength dependent perturbation values and the sensitivity kernels; and determine a respective shear velocity for each of the multiple layers based on the far-field shear velocity and the shear velocity perturbation values.

What is claimed is:

1. A method for profiling acoustic shear velocities in a borehole, said method comprising:
generating a measured flexural wave velocity dispersion based on measured flexural wave velocities;
determining formation properties including determining a far-field shear velocity based, at least in part, on the measured flexural wave velocity dispersion;
generating a reference flexural wave velocity dispersion based on the determined formation properties;
generating a linear approximation model for an alteration zone having multiple layers, said generating a linear approximation model including:
for each of the multiple layers, generating a set of wavelength dependent perturbation values based on differences between wavelength-correspondent velocities in the measured flexural wave velocity dispersion and the reference flexural wave velocity dispersion; and
generating a respective sensitivity kernel for each of the multiple layers based on ratios between each respective set of wavelength dependent perturbation values generated for the multiple layers and an approximated shear velocity perturbation value, including generating the linear approximation model including selecting a first number of layers and a first approximated shear velocity perturbation value, and including applying a linearity constraint to the generation of each of the respective sensitivity kernels including:
determining whether a first set of generated sensitivity kernels satisfy a linearity threshold,
in response to the first set of sensitivity kernels not satisfying the linearity threshold, selecting at least one of a second number of layers and a second approximated shear velocity perturbation value, and
re-generating the linear approximation model using at least one of the second number of layers and the second approximated shear velocity perturbation value;
processing the linear approximation model to determine a set of shear velocity perturbation values based on the wavelength dependent perturbation values and the sensitivity kernels; and
determining a respective shear velocity for each of the multiple layers based on the far-field shear velocity and the set of shear velocity perturbation values.

2. The method of claim 1, further comprising:
determining corresponding radially shear wave velocity profiles based on the shear velocity perturbation values;
generating predicted flexural wave phase velocities resulting from the determined corresponding radially shear wave velocity profiles;
comparing the predicted flexural wave phase velocities with the measured flexural wave velocities; and
in response to differences between the predicted flexural wave velocities and the measured flexural wave velocities exceeding a threshold, generating the linear approximation model using another reference flexural wave velocity dispersion.

3. The method of claim 1, wherein said determining the far-field shear velocity comprises generating a low-frequency asymptote of the measured flexural wave velocity dispersion and determining the far-field shear velocity as corresponding to an asymptotic limit of the low-frequency asymptote.

4. The method of claim 1, wherein said generating a measured flexural wave velocity dispersion and said generating a reference flexural wave velocity dispersion comprise:
  determining frequency dependent dispersions of the measured flexural wave velocities and the reference flexural wave velocities; and
  normalizing the frequency dependent dispersions based on a ratio of flexural wave wavelength and a borehole radius value.

5. The method of claim 1, wherein said generating a set of wavelength dependent perturbation values comprises applying a flexural mode perturbation function to the measured flexural wave velocity dispersion and the reference flexural wave velocity dispersion, wherein the flexural mode perturbation function specifies flexural mode perturbation values, m, in accordance with the relation, $$m(\eta) = \frac{(s_d - s_0)}{s_0}\bigg|_\eta$$

where $s_d$ represents measured flexural wave velocity, $s_0$ represents reference flexural wave velocity, and $\eta$ represents wavelength normalized by a specified radial distance.

6. The method of claim 1, wherein said generating a respective sensitivity kernel for each of the multiple layers comprises:
  for each of the multiple layers,
    generating a flexural mode perturbation dispersion as a function of normalized wavelength; and
    for each of a selected sampling range of normalized wavelength values, computing a sensitivity kernel as the ratio between a flexural mode perturbation value and the approximated shear velocity perturbation value.

7. The method of claim 1, wherein said processing the linear approximation model to determine the set of shear velocity perturbation values comprises determining the set of shear velocity perturbation values as an inversion function of the wavelength dependent perturbation values and the shear velocity sensitivity kernels.

8. The method of claim 1, wherein said determining of the respective shear velocity for each of the multiple layers comprises for each of the respective multiple layers, computing a shear velocity in accordance with the relation, $$V_i = (1+u_i)V_0,$$

where $V_i$ represents the shear velocity of the $i^{th}$ annular layer, $u_i$ represents the shear velocity perturbation of the $i^{th}$ annular layer, and $V_0$ represents the far-field shear velocity.

9. The method of claim 1, further comprising:
  emitting, by a dipole acoustic source within a borehole, acoustic energy into a formation; and
  measuring, by an acoustic receiver, velocities of flexural waves generated by the acoustic energy.

10. An apparatus comprising:
  a processor; and
  a machine-readable medium having program code executable by the processor to cause the apparatus to,
    generate measured flexural wave velocity dispersion based on measured flexural wave velocities;
    determine formation properties including determining a far-field shear velocity based, at least in part, on the measured flexural wave velocity dispersion;
    generate a reference flexural wave velocity dispersion based on the determined formation properties;
    generate a linear approximation model for an alteration zone having multiple layers, said generating a linear approximation model including:
      for each of the multiple layers, generating a set of wavelength dependent perturbation values based on differences between wavelength-correspondent velocities in the measured flexural wave velocity dispersion and the reference flexural wave velocity dispersion; and
      generating a respective sensitivity kernel for each of the multiple layers based on ratios between each respective set of wavelength dependent perturbation values generated for the multiple layers and an approximated shear velocity perturbation value, including generating the linear approximation model including selecting a first number of layers and a first approximated shear velocity perturbation value, and including applying a linearity constraint to the generation of each of the respective sensitivity kernels including:
        determining whether a first set of generated sensitivity kernels satisfy a linearity threshold,
        in response to the first set of sensitivity kernels not satisfying the linearity threshold, selecting at least one of a second number of layers and a second approximated shear velocity perturbation value, and
        re-generating the linear approximation model using at least one of the second number of layers and the second approximated shear velocity perturbation value;
    process the linear approximation model to determine a set of shear velocity perturbation values based on the wavelength dependent perturbation values and the sensitivity kernels; and
    determine a respective shear velocity for each of the multiple layers based on the far-field shear velocity and the set of shear velocity perturbation values.

11. The apparatus of claim 10, further comprising program code executable by the processor to cause the apparatus to:
  determine corresponding radially shear wave velocity profiles based on the shear velocity perturbation values;
  generate predicted flexural wave phase velocities resulting from the determined corresponding radially shear wave velocity profiles;
  compare the predicted flexural wave phase velocities with the measured flexural wave velocities; and
  in response to differences between the predicted flexural wave velocities and the measured flexural wave velocities exceeding a threshold, generate the linear approximation model using another reference flexural wave velocity dispersion.

12. The apparatus of claim 10, wherein the program code executable by the processor to cause the apparatus to determine the far-field shear velocity comprises program code executable by the processor to cause the apparatus to generate a low-frequency asymptote of the measured flexural wave velocity dispersion and determining the far-field shear velocity as corresponding to an asymptotic limit of the low-frequency asymptote.

13. The apparatus of claim 10, wherein the program code executable by the processor to cause the apparatus to generate a measured flexural wave velocity dispersion and generate a reference flexural wave velocity dispersion comprises program code executable by the processor to cause the apparatus to:
  determine frequency dependent dispersions of the measured flexural wave velocities and the reference flexural wave velocities; and
  normalize the frequency dependent dispersions based on a ratio of flexural wave wavelength and a borehole radius value.

14. The apparatus of claim 10, wherein the program code executable by the processor to cause the apparatus to generate a set of wavelength dependent perturbation values comprises program code executable by the processor to cause the apparatus to apply a flexural mode perturbation function to the measured flexural wave velocity dispersion and the reference flexural wave velocity dispersion, wherein the flexural mode perturbation function specifies flexural mode perturbation values, m, in accordance with the relation, $$m(\eta) = \frac{(s_d - s_0)}{s_0}\bigg|_\eta$$

where $s_d$ represents measured flexural wave velocity, $s_0$ represents reference flexural wave velocity, and $\eta$ represents wavelength normalized by a specified radial distance.

15. The apparatus of claim 10, wherein the program code executable by the processor to cause the apparatus to generate a respective sensitivity kernel for each of the multiple layers comprises program code executable by the processor to cause the apparatus to:
  for each of the multiple layers,
    generate a flexural mode perturbation dispersion as a function of normalized wavelength; and
    for each of a selected sampling range of normalized wavelength values, determine a sensitivity kernel as the ratio between a flexural mode perturbation value and the approximated shear velocity perturbation value.

16. The apparatus of claim 10, wherein the program code executable by the processor to cause the apparatus to process the linear approximation model to determine the set of shear velocity perturbation values comprises program code executable by the processor to cause the apparatus to determine the set of shear velocity perturbation values as an inversion function of the wavelength dependent perturbation values and the sensitivity kernels.

17. The apparatus of claim 10, wherein the program code executable by the processor to cause the apparatus to determine the respective shear velocity for each of the multiple layers comprises program code executable by the processor to cause the apparatus to, for each of the respective multiple layers, compute a shear velocity in accordance with the relation, $$V_i = (1 + u_i)V_0,$$

where $V_i$ represents the shear velocity of the $i^{th}$ annular layer, $u_i$ represents the shear velocity perturbation of the $i^{th}$ annular layer, and $V_0$ represents the far-field shear velocity.

18. One or more non-transitory machine-readable media comprising program code for profiling acoustic shear velocities in a borehole, the program code to:
  generate measured flexural wave velocity dispersion based on measured flexural wave velocities;
  determine formation properties including determining a far-field shear velocity based, at least in part, on the measured flexural wave velocity dispersion;
  generate a reference flexural wave velocity dispersion based on the determined formation properties;
  generate a linear approximation model for an alteration zone having multiple layers, said generating a linear approximation model including:
    for each of the multiple layers, generating a set of wavelength dependent perturbation values based on differences between wavelength-correspondent velocities in the measured flexural wave velocity dispersion and the reference flexural wave velocity dispersion; and
    generating a respective sensitivity kernel for each of the multiple layers based on ratios between each respective set of wavelength dependent perturbation values generated for the multiple layers and an approximated shear velocity perturbation value, including generating the linear approximation model including selecting a first number of layers and a first approximated shear velocity perturbation value, and including applying a linearity constraint to the generation of each of the respective sensitivity kernels including:
      determining whether a first set of generated sensitivity kernels satisfy a linearity threshold,
      in response to the first set of sensitivity kernels not satisfying the linearity threshold, selecting at least one of a second number of layers and a second approximated shear velocity perturbation value, and
      re-generating the linear approximation model using at least one of the second number of layers and the second approximated shear velocity perturbation value;
  process the linear approximation model to determine a set of shear velocity perturbation values based on the wavelength dependent perturbation values and the sensitivity kernels; and
  determine a respective shear velocity for each of the multiple layers based on the far-field shear velocity and the set of shear velocity perturbation values.

* * * * *